(12) United States Patent
Gadh et al.

(10) Patent No.: US 9,290,104 B2
(45) Date of Patent: Mar. 22, 2016

(54) POWER CONTROL APPARATUS AND METHODS FOR ELECTRIC VEHICLES

(71) Applicant: THE REGENTS OF THE UNIVERSITY OF CALIFORNIA, Oakland, CA (US)

(72) Inventors: Rajit Gadh, Los Angeles, CA (US); Ching-Yen Chung, Los Angeles, CA (US); Chi-Cheng Chu, Laguna Beach, CA (US); Li Qiu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 187 days.

(21) Appl. No.: 13/975,313

(22) Filed: Aug. 24, 2013

(65) Prior Publication Data
US 2014/0062401 A1 Mar. 6, 2014

Related U.S. Application Data

(60) Provisional application No. 61/693,197, filed on Aug. 24, 2012.

(51) Int. Cl.
*H02J 7/00* (2006.01)
*B60L 11/18* (2006.01)

(52) U.S. Cl.
CPC .......... *B60L 11/1838* (2013.01); *Y02T 10/7005* (2013.01); *Y02T 90/121* (2013.01); *Y02T 90/128* (2013.01); *Y02T 90/14* (2013.01); *Y02T 90/163* (2013.01)

(58) Field of Classification Search
CPC .............. Y02T 90/163; Y02T 10/7088; Y02T 10/7055; B60L 11/1825; B60L 11/1838; G07F 15/005; H02J 7/0027

USPC .......................................................... 320/109
See application file for complete search history.

(56) References Cited

U.S. PATENT DOCUMENTS

| | | | | |
|---|---|---|---|---|
| 5,369,472 | A | * | 11/1994 | Raj et al. ........................... 399/8 |
| 5,548,200 | A | * | 8/1996 | Nor et al. ...................... 320/109 |
| 5,780,991 | A | * | 7/1998 | Brake et al. ................... 320/112 |
| 7,256,516 | B2 | | 8/2007 | Buchanan et al. |
| 7,444,192 | B2 | | 10/2008 | Dickinson et al. |
| 7,956,570 | B2 | | 6/2011 | Lowenthal et al. |
| 8,013,570 | B2 | | 9/2011 | Baxter et al. |

(Continued)

OTHER PUBLICATIONS

County of Sonoma, General Services Department, "Electric Vehicle Charging Station Program and Installation Guidelines" Jul. 2011, pp. 1-65.

(Continued)

*Primary Examiner* — Vuthe Siek
(74) *Attorney, Agent, or Firm* — O'Banion and Ritchey LLP; John P. O'Banion

(57) ABSTRACT

Electric vehicle (EV) charging apparatus and methods are described which allow the sharing of charge current between multiple vehicles connected to a single source of charging energy. In addition, this charge sharing can be performed in a grid-friendly manner by lowering current supplied to EVs when necessary in order to satisfy the needs of the grid, or building operator. The apparatus and methods can be integrated into charging stations or can be implemented with a middle-man approach in which a multiple EV charging box, which includes an EV emulator and multiple pilot signal generation circuits, is coupled to a single EV charge station.

13 Claims, 23 Drawing Sheets

(56) References Cited

U.S. PATENT DOCUMENTS

| | | | |
|---|---|---|---|
| 8,138,715 B2 | 3/2012 | Lowenthal et al. | |
| 8,278,881 B2 | 10/2012 | Woody et al. | |
| 2002/0070705 A1 | 6/2002 | Buchanan et al. | |
| 2009/0174365 A1 | 7/2009 | Lowenthal et al. | |
| 2010/0114798 A1 | 5/2010 | Sirton | |
| 2010/0176763 A1* | 7/2010 | Yen | 320/118 |
| 2010/0211340 A1 | 8/2010 | Lowenthal et al. | |
| 2011/0029157 A1 | 2/2011 | Muzaffer | |
| 2011/0133693 A1 | 6/2011 | Lowenthal et al. | |
| 2011/0191265 A1 | 8/2011 | Lowenthal et al. | |
| 2011/0202418 A1 | 8/2011 | Kempton et al. | |
| 2011/0304298 A1 | 12/2011 | Gow et al. | |
| 2011/0316482 A1 | 12/2011 | Baxter et al. | |
| 2012/0173292 A1 | 7/2012 | Solomon et al. | |
| 2013/0229149 A1* | 9/2013 | Sortomme | 320/109 |

OTHER PUBLICATIONS

Porter et al. "Energy Efficiency Battery Charger System Test Procedure," Version 2.2, Nov. 12, 2008, pp. 1-32.

Plug in America "Hawaii EV Ready Guidebook for Commercial Electric Vehicle Charging Station Installations" May 2012, pp. 1-47.

* cited by examiner

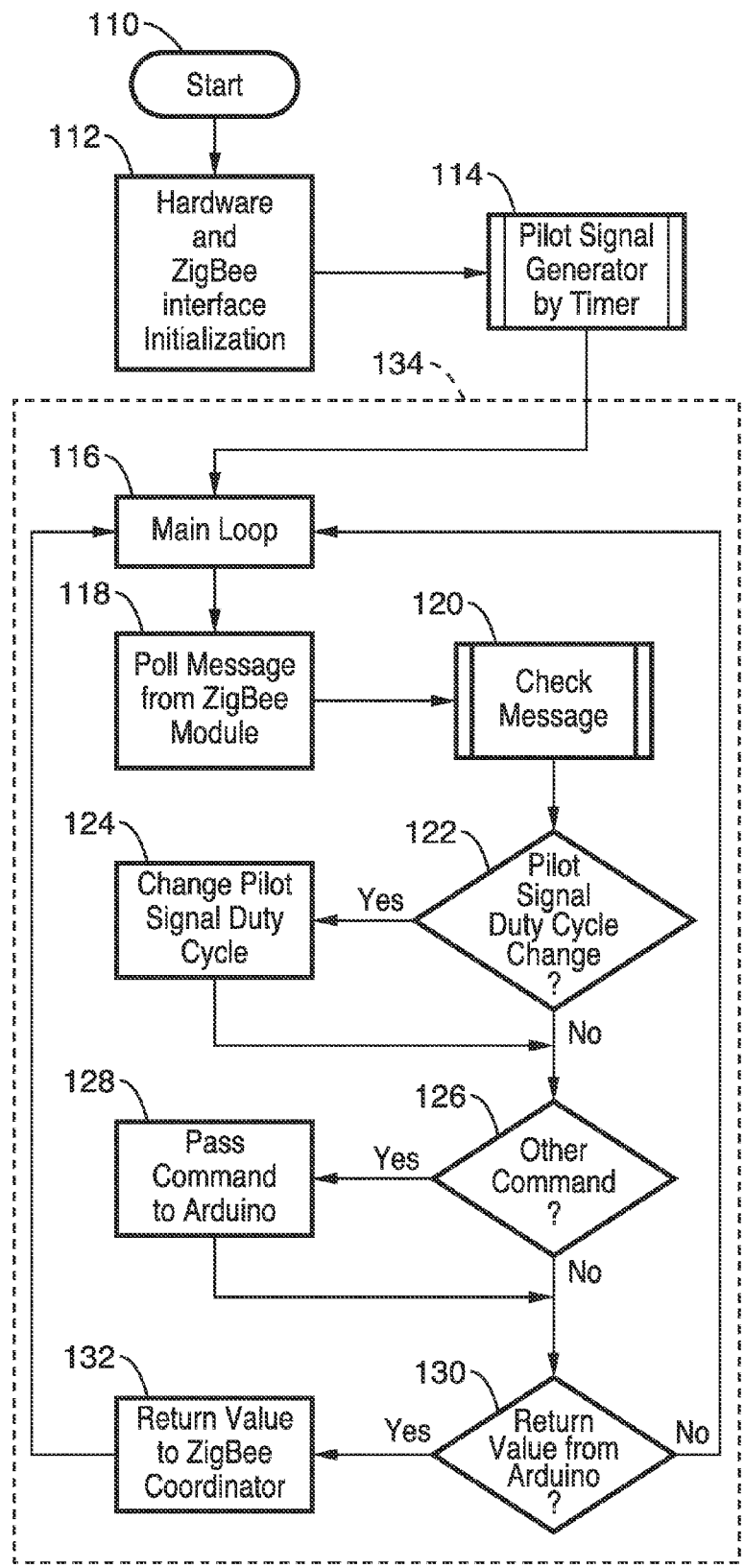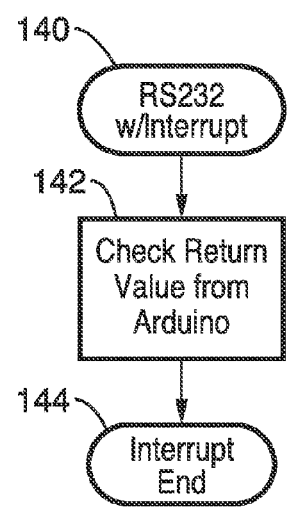
FIG. 5A
FIG. 5B

FIG. 8A

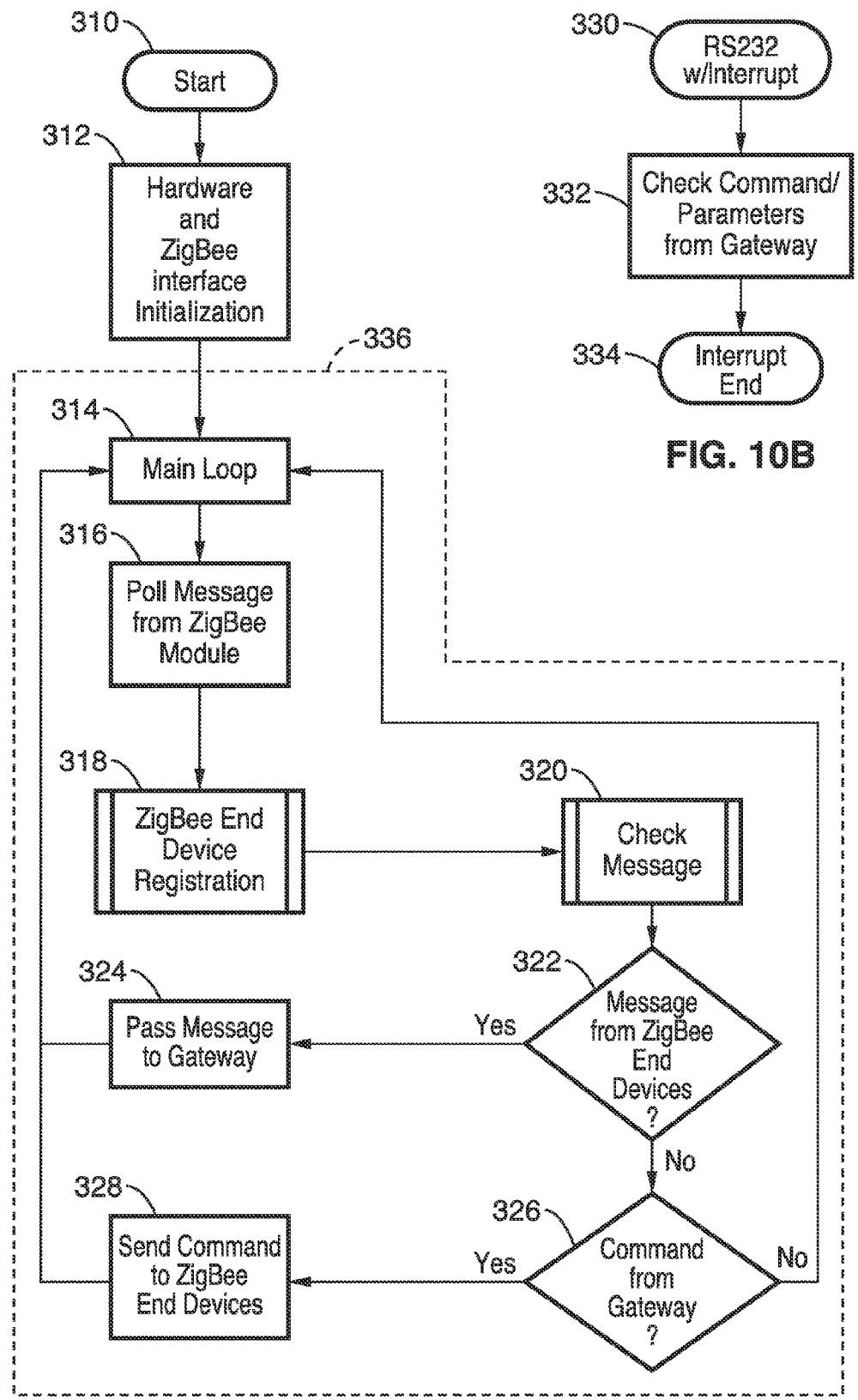

POWER CONTROL APPARATUS AND METHODS FOR ELECTRIC VEHICLES

STATEMENT REGARDING FEDERALLY SPONSORED RESEARCH OR DEVELOPMENT

This invention was made with Government Support under DE-OE0000192, awarded by the U.S. Department of Energy. The Government has certain rights in the invention.

CROSS-REFERENCE TO RELATED APPLICATIONS

This application is a nonprovisional of U.S. provisional patent application Ser. No. 61/693,197 filed on Aug. 24, 2012, incorporated herein by reference in its entirety.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to charging of electric vehicles, and more particularly to an infrastructure for smart charging of electric vehicles.

2. Description of Related Art

Electric Vehicles (EV) are becoming a preferred choice for many individuals, particularly as the world looks toward lowering its dependence on fossil fuels. As the number of EVs on the road increase, charging stations in both parking structures and home garages will become more important for longer distance commuters. An available charging station may be a critical requirement to ensure the ability to finish the round trip and be able to arrive back home.

Presently available commercial EV charging stations, such as from manufacturers Coulomb® and Blink®, have their own proprietary networks to connect the charging stations in service. Coulomb provides a ChargePoint® application programming interface (API) and an OpenCharge™ protocol for the developers. Their present application uses their network to locate available charging stations for its users. Other commercial charging stations, such as Leviton and Clippercreek, simply provide basic charging stations without any network features.

When Electric Vehicles (EVs) are charged utilizing these conventional charging systems, the only option is to charge at a selected current or not to charge. However, these limited charging options can pose problems for the power grid, in particular as EVs become more widely adopted and numerous EVs may be charging in a given area.

Accordingly, a need exists for a smart charging infrastructure. The present invention fulfills that needs and others in an advanced EV charging system.

BRIEF SUMMARY OF THE INVENTION

Apparatus and method are described which lower EV charger implementation costs, provide additional options for user and parking operators, while providing more grid-friendly charging of Electric Vehicles (EVs). Currently available systems provide the option to charge at their selected current or not to charge at all. The conventional approach does not consider various parameters, including the state of the power grid. This is particularly problematic when one considers that a number of EVs may be charging in one location at a given time. During a day when there is a power shortage, the charging infrastructure should have options to either shut off the power to the charging stations or to lower the power to the EVs in order to satisfy the needs of the grid. The present invention controls the current being disbursed to these electric vehicles by multiplexing power and providing charge control, toward remediating energy shortages in local grids.

The invention separates the power supply from the networking communications and includes multiple current control systems within the charging system. The apparatus can be implemented as a middle-man solution which is integrated within existing charging networks and stations to provide a more grid-friendly infrastructure.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 5A and FIG. 5B are flow diagrams of controlling pilot signal generation according to an embodiment of the present invention.

FIG. 8A and FIG. 8B is a schematic of a 4-channel pilot signal generator and monitor according to an embodiment of the present invention.

FIG. 10A and FIG. 10B are flow diagrams of coordinator operation according to an embodiment of the present invention.

DETAILED DESCRIPTION OF THE INVENTION

1. Introduction

Smart EV charging technology is described which controls the current being disbursed to electric vehicles charged either at home or at a commercial installation. In order to satisfy the demand of EV charging requests, an EV charge management system according to the invention is implemented to handle peak time EV charging, regardless of whether the charging takes place in a parking garage or at home. The ability of a charging station to service multiple vehicles simultaneously allows meeting increasing demand for charging infrastructure, by distributing available charge current across multiple EVs at a charging station, thus rationing available power, to optimize power utilization and prevent overloading a circuit or any given state of a power grid, power allocation (e.g., to the building).

This form of power distribution is performed by a charge management system which controls power availability to each of the charging EVs. So for example, if four EVs are charging, but only enough power is available to charge one EV, then that charging power is divided and shared across the set of charging EVs.

With this smart charging infrastructure, the shortage of energy in a local grid subject to charging numerous EVs could be solved. For example, considering a day when there is a power shortage, the charging infrastructure provides options to either shut off the power to the charging stations or to lower the power to the EVs in order to satisfy the needs of the grid. Similarly, as the state of the power grid improves (e.g., other loads on the grid decrease (EV, conventional loads, or a combination of EVs and conventional loads), or more power is made available to the grid), then power is either turned on or increased to the EVs by the inventive system. A number of grid situations can be accommodated in response to sharing available current to the EVs being charged. Another advantage of the present invention, is that it can be implemented using existing networks, API and protocols, such as those of EV charge makers (i.e., Coulomb).

The present invention provides a smart charging infrastructure, which by way of example and not limitation, is incorporated in a system generally referred to herein as WINSmartEV™. This system allows remote monitoring and variable current control of EV charging which is capable of providing power to several EVs from one power grid circuit in response to variable current controlled charging. It is expected that use of this smart charging infrastructure to manage EV charge scheduling and current flow, could prevent energy shortage in local grids under certain circumstances.

2. System Architecture

Figure 1:
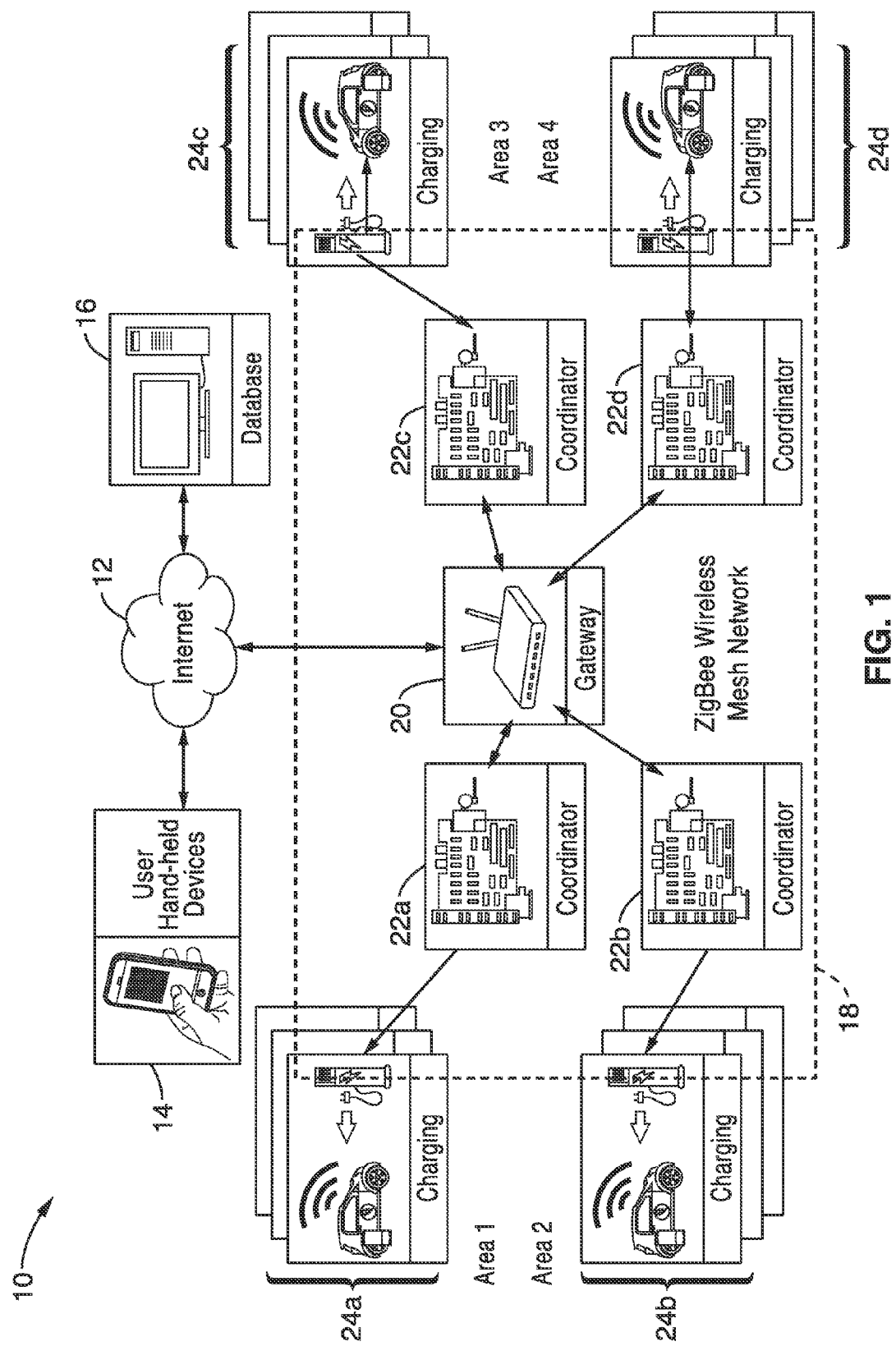
FIG. 1 is a block diagram of a smart charging infrastructure according to an embodiment of the present invention.

FIG. 1 illustrates an example embodiment 10 of a smart charging infrastructure having a wide area network 12, such as the internet, to which is connected a server with database 16 and preferably hand held devices 14 from which commands are received and charging statistics communicated, thereby providing remote control and monitoring. The server 16 controls high level charging activation, after users are logged in or otherwise verified by the server, and sends commands to coordinators through a gateway 20 coupled to multiple coordinators 22a, 22b, 22c, 22d, within a charging station 18. Each coordinator controls charging of multiple EVs an area 24a, 24b, 24c, 24d (Area 1, Area 2, Area 3, Area 4). Although four coordinators are shown in the figure for controlling four areas, it should be appreciated that the present invention can be configured to control any number of multiple areas (e.g., 2 to n).

Charging speed at each area charging station is thus controlled through the server while the system gathers and accumulates power information. It will be appreciated that a number of parameters are preferably taken into account within the present invention to control EV charging current. For example each charging station may have a maximum available current, such as 16, 30, or 60 amps. In addition, the structure providing the charge stations may have limitations on the total amount of power available to the power stations. Furthermore, the building may have daily or other periodic allotments or other limitations regarding power use. Still further, the power grid itself may reach peak times where power demand will exceed available power (e.g., hot days when air conditioning is being widely used). Information about each of the above limitations is preferably provided to the server and/or gateway as fixed values, estimates, or in a real time form. The present invention is configured for taking each of these into account as well as user directives as to charging. For example, users can specify the amount of charging they desire (e.g., percentage charge), or time period available for charging (e.g., they may be departing in an hour), or want minimum cost charging, and so forth.

The gateway 20 is configured with multiple protocols for efficiently communicating on one side through the internet 12 to a server 16 as well as for communicating to the charging infrastructure with multiple coordinators 22a, 22b, 22c, and 22d controlling multiple EV charging. It should be appreciated that the term 'charging station' is used herein to describe charging hardware coupled to a single power connection to the grid. Herein these elements are utilized with the inventive hardware for controlling charging of multiple vehicles. One embodiment of the invention for example allows charging of four EVs from four cords extending from a single charging station. It will be appreciated that even if three of these four charging connections are routed to different parking spots, the charging station refers to the circuitry controlling EV charging and not simply the cable which is made available at a parking spot.

On the internet side, the gateway preferably communicates with a high speed mobile telecommunications protocol, such as 3G or 4G communications. The use of 3G or 4G communication is preferred due to its flexibility and accessibility, especially where wired or WiFi communication is unavailable. It will be noted that although the tested examples utilized 3G wireless, that 4G and other wireless standards may be utilized without departing from the present invention. It should also be appreciated that the present invention can utilize other wired or wireless communication connections as convenient to the installation.

For communication with the charging devices in the charging infrastructure, the wireless ZigBee protocol is preferred. The ZigBee protocol is preferred for its low power and mesh network capabilities and additionally it has been selected for use by the National Institute of Standards and Technology (NIST) in its first draft of the framework and roadmap to coordinate the interoperability and standards for the smart grid. It should be noted that ZigBee is described by way of example and not limitation herein, while other protocols may be similarly utilized without departing from the teachings of the present invention.

User commands and preferences are entered by the user to the server, such as through any internet connection including a user hand-held device. In at least one embodiment, the system supports different levels of control, for example gathering information not only from the EV being charged, but from the user associated with a given EV being charged, and even from the 'garage' or other entity managing the charge facility. In addition, input is received about the state of the grid to which the charging station is connected. In at least one embodiment, charging is regulated on the basis of a combination of these inputs and preferences.

For example, based on user preference and the local power capacity and status, charging efficiency is optimized in response to sending commands to the charging station through the multiple protocol gateway, depicted as communications from gateway 20 to coordinators 22a, 22b, 22c, and 22d, such as utilizing the ZigBee wireless mesh network. In at least one embodiment, the system provides a charging rate which is gradually stepped up or down, or more preferably smoothly varied, based on the state of the local grid.

Figure 2:
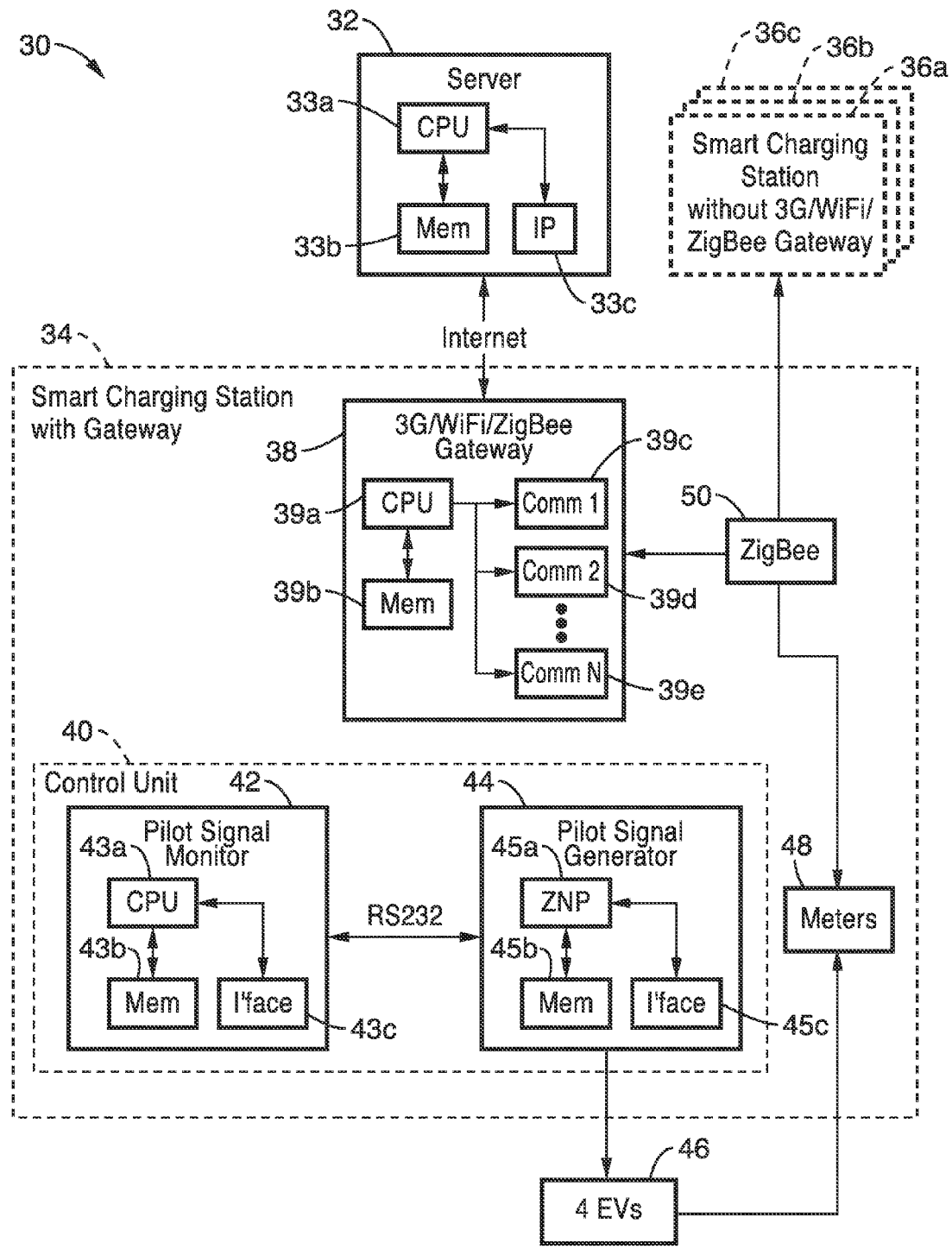
FIG. 2 is a block diagram of a smart charging infrastructure according to an embodiment of the present invention, showing control unit and metering connections to a gateway.

FIG. 2 illustrates an example embodiment 30 of the connection of a server 32 to a smart charging station 34, and optional additional smart charging stations 36a, 36b, 36c, utilizing a gateway 38. The server is shown having at least one computer processor (CPU) 33a and memory 33b, and is configured with a communications interface 33c (e.g., IP protocol) to connect to the network. In similar manner, gateway 38 incorporates at least one computer processor 39a and contains memory 39b, and is preferably configured with up to N multiple communication interfaces (e.g., comm1 39c, comm2 39d, . . . commN 39e), which in the present embodiment preferably comprise IP, WiFi and ZigBee protocols.

In this example embodiment, a wireless connection with the internet is shown using WiFi, 3G (or 4G), or a combination of WiFi and 3G (or 4G). The gateway 38 is shown wirelessly connecting to a control unit 40 utilizing a ZigBee protocol. The information interchanged between the gateway, meters, and the control unit are all communicated, by way of example, through the ZigBee protocol. It will also be appreciated that the present system may receive command information over the internet from a cloud computing service.

Control unit 40 contains a pilot signal monitor 42 coupled for communication to a pilot signal generator 44, such as by a serial interface (e.g., RS-232) or other desired connection (e.g., serial, parallel or even wireless). In the embodiment described, pilot signal generator 44 outputs multiple pilot signals, with one pilot signal line within each charging cord to which an EV may be connected. The charging cords and associated protocols in the present example follow the SAE J1772 standard, whose full name is "SAE Surface Vehicle Recommended Practice J1772, SAE Electric Vehicle Conductive Charge Coupler". This standard covers the general physical, electrical, communication protocol, and performance requirements for the electric vehicle conductive charge systems and couplers. One of ordinary skill in the art will appreciate that the techniques utilized herein can be utilized with a charge system following other protocols in which the charger communicates with the EV and specifies maximum charge levels using some form of pilot signal mechanism.

The connector for SAE J1772 has five pins: (1) AC line 1, (2) AC line 2, (3) ground pin, (4) proximity detection pin, and (5) control pilot pin (pilot). The proximity detection pin prevents movement of the EV while connected to the charger, while the pilot is a communication line. It will be appreciated that under this standard, charging current does not flow to the EV until commanded by the vehicle. For safety, the connection pins are of the first-make, last-break variety. If the charge plug is removed while in the charging port of a charging vehicle, the control pilot and proximity detection pins will break contact first so that the power pin relay in the charging station will be shut off and no current will flow.

The pilot is a communication line for coordinating activity and charging levels between the EV and charge system. It will be appreciated that the SAE J1772 pilot is a 1 kHz +12V to −12V square wave, with its voltage defining the state. The EV adds resistance from pilot to ground to vary the voltage in communicating over that line. The charging station communicates a value of maximum available charging current to the EV in response to PWM modulation of the pilot waveform. For example maximum current of 10, 16, 32 and a fast charge are signaled with 16%, 25%, 50% and 90% PWM respectively according to the standard.

It will be noted that two charging levels are presently provided under the SAE J1772 standard. Level 1 charging with the AC lines being single phase 120 VAC with peak current of 16 Amps, and level 2 charging with split-phase 240 VAC having a peak current at 80 Amps. It is possible that level 3 charging will be added to the standard in the future for fast charging at up to 400 Amps between 200-600 VAC. The present invention is described for use with level 1 and level 2 charging and can be utilized in the future for level 3 charging. It will be appreciated that level 3 charging would likely be implemented only on new charging stations in view of the need for wiring to higher voltage supplies with much higher current carrying capability and the need to control those higher power levels within the charge station. Yet, the present invention as a middle-man implementation could support these level 3 systems, such as by a simple software upgrade.

The pilot signal monitor 42 contains a computer processor 43a with memory 43b upon which programming executes for controlling pilot signal generation and outputting control data to an interface 43c, such as a serial RS-232 interface. A processor board, such as Arduino® UNO, or any of a number of others will provide this functionality. In the example embodiment, pilot signal generator 44 comprises a communications device or processor, such as a ZigBee network processor (ZNP) 45a, (e.g., Texas Instruments® CC2530ZNP) and associated memory 45b and communications interface 45c. Multiple pilot signals are output from pilot signal generator 44 for coupling to multiple EVs 46 (e.g., four in the example shown) at the charging station. It will be noted that in this example embodiment, the multiple pilot signals are separate and controlled independently, whereby each pilot signal separately controls the maximum rate of charge within each respective electric vehicle coupled to a charge station.

Sensors or meters 48 are coupled to the charge stations for collecting desired charge related information, such as voltage and charge rate. A ZigBee interface 50 is shown for communicating the measurement information to the gateway.

In at least one embodiment, the control circuits for adding the middle-man layer according to the invention are preferably contained in a single housing. Each housing contains the control unit, communication interfaces and a gateway (or at least a communication connection to share another gateway) to communicate with multiple control units to control charging at a number of charging stations. Converting an existing charging infrastructure to the inventive system, requires only the connection of a single housing at each charging station to control the charging of multiple vehicles, such as four EVs as described in the example embodiments. The use of wireless protocols in the present invention simplifies implementation as it allows a control box to be connected at the charging station without the need to add wiring between charging stations to support the middle-man layer.

It should be recognized that each of the modules which are described within embodiments of the invention as containing a processor and memory may be implemented with more than one processor or memory, or combination of processors and memories. These processors may comprise microcontrollers (i.e., containing both CPU, memory and often I/O within a single device), microprocessors, processor modules or boards, application specific integrated circuits (ASICs) containing processor and memory circuitry and combinations thereof. In addition, the present invention is non-limiting with regard to memory and computer-readable media, insofar as these are non-transitory, and thus not constituting a transitory electronic signal.

It should be appreciated in the described embodiment that since a number of control devices in each charging station can communicate using ZigBee mesh network capabilities, the charging stations can also use this mechanism according to embodiments of the present invention to communicate with each other. Therefore, only one gateway is required in each localized area to access the internet, and this one gateway may be shared across multiple charging devices. In view of this, additional smart charging stations 36a, 36b, 36c are shown in FIG. 2 sharing the same gateway. It will be appreciated that a number of charge stations can share a gateway, with the maximum number depending on the hardware and extent of data communication over the ZigBee interfaces.

2.1. Metering System.

In the four EV charging example seen in FIG. 2, each charging station is configured with a gateway, four meters, four safety relays, and a control unit. The gateway is preferably shared amongst multiple charging stations which are coupled for communication, such as exemplified using the ZigBee mesh network. Upon receiving the command of retrieving power information, the meter returns its power information, including voltage, current, and power, to the gateway through the ZigBee communication.

Figure 3:
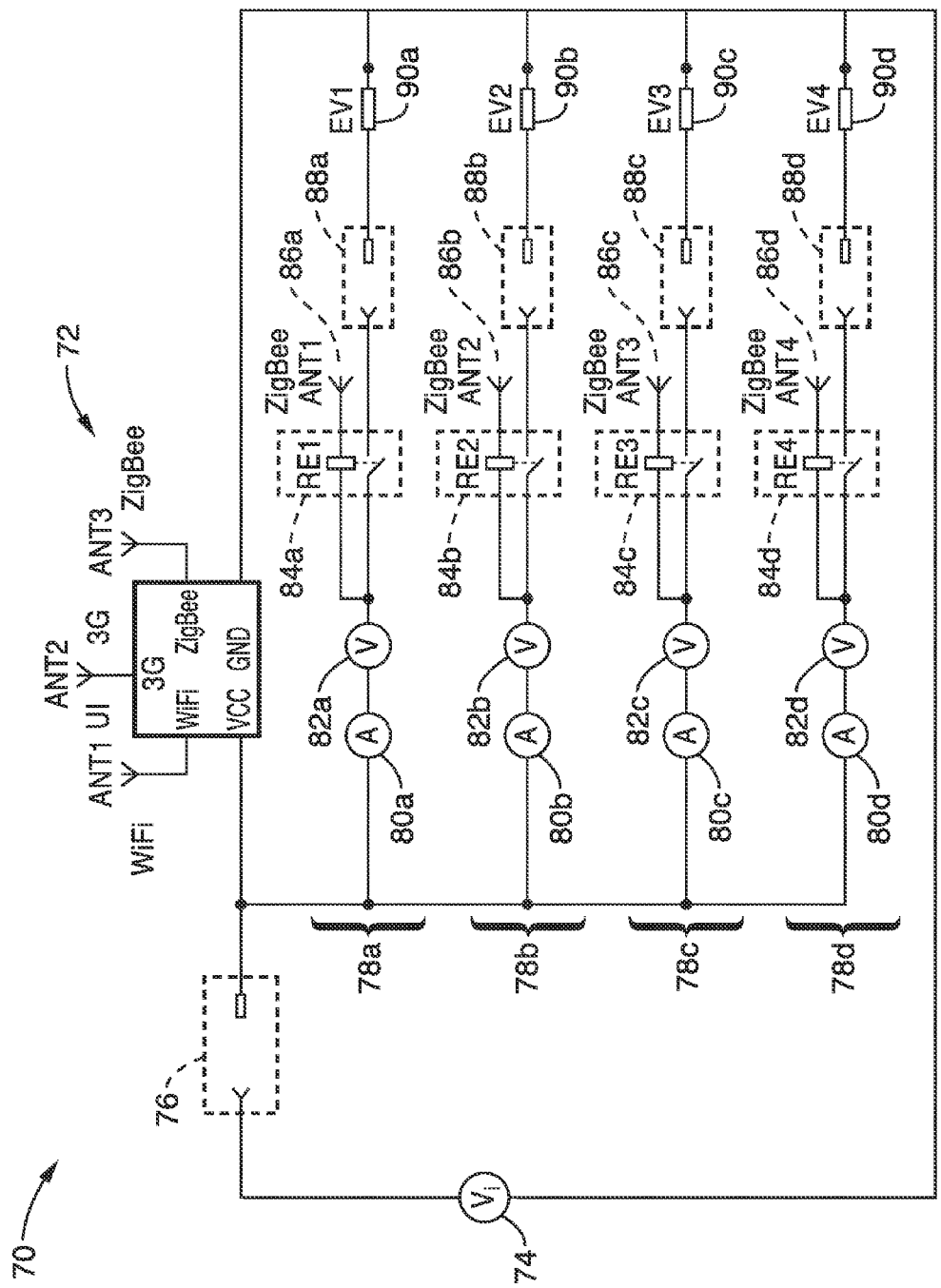
FIG. 3 is a schematic of a metering system according to an embodiment of the present invention.

FIG. 3 illustrates an example embodiment 70 of a four-channel metering system. A control unit 72 is shown exemplified here with WiFi, 3G, and ZigBee antennas. Source voltage 74 is connected through plug 76 to multiple parallel EV connections 78a, 78b, 78c, and 78d which share the current available from that one source. It should be recognized that connector 76 represents the power connection from the original single EV charger from which power is being drawn and divided by the inventive system to charge multiple vehicles. If that original single EV charger follows the SAE 1772 specification (or similar), then an EV emulator integrated within the present invention is coupled to the pilot from the original single EV charger to 'trick it' into thinking it is performing its single EV charging, while in fact the present invention is using the power being output and dividing it across a number of EVs to which it is individually communicating with by separate pilot signals.

Power from the single source is shared across multiple EV connections, shown here exemplified with four connections. By way of example, the upper most parallel connection is shown with ammeter 80a, voltmeter 82a, and a control relay 84a, which is also referred to herein as a safety relay, as it is not used for regulating charge, but only for allowing disconnecting power to the EV charge cord (called resetting). Control relay 84a is shown with an antenna 86a, through which it receives commands to allow connecting or disconnecting the circuit with plug connection 88a to EV1 90a. Similarly, the second parallel connection has an ammeter 80b, voltmeter 82b, relay 84b with antenna 86b controlling power through connector 88b to EV2 90b. The third parallel connection has an ammeter 80c, voltmeter 82c, relay 84c with antenna 86c controlling power through connector 88c to EV3 90c. The fourth parallel connection has an ammeter 80d, voltmeter 82d, relay 84d with antenna 86d controlling power through connector 88d to EV4 90d.

It should be noted that the relays of each channel can be turned on and off by the server, control unit of the charging station, or GFCI circuit (not shown). It should be appreciated that the controller in this inventive EV charger can perform remote (e.g., wireless) reset of the relay into an open non-conductive state as well as an automatic restart.

2.2. Control Unit of the Charging Station.

In a preferred embodiment, the charging cable interface is SAE J1772 as described, with the pilot signal in a pulse width modulation (PWM) format. Based on the duty cycle of the pilot signal provided by the charging station, the EV adjusts its charging load to meet the current limitation and conditions. With this characteristic, the charging station is able to control the charging speed by changing the duty cycle of the pilot signal which signals the maximum amount of current that an EV can draw from the charger.

Figure 4:
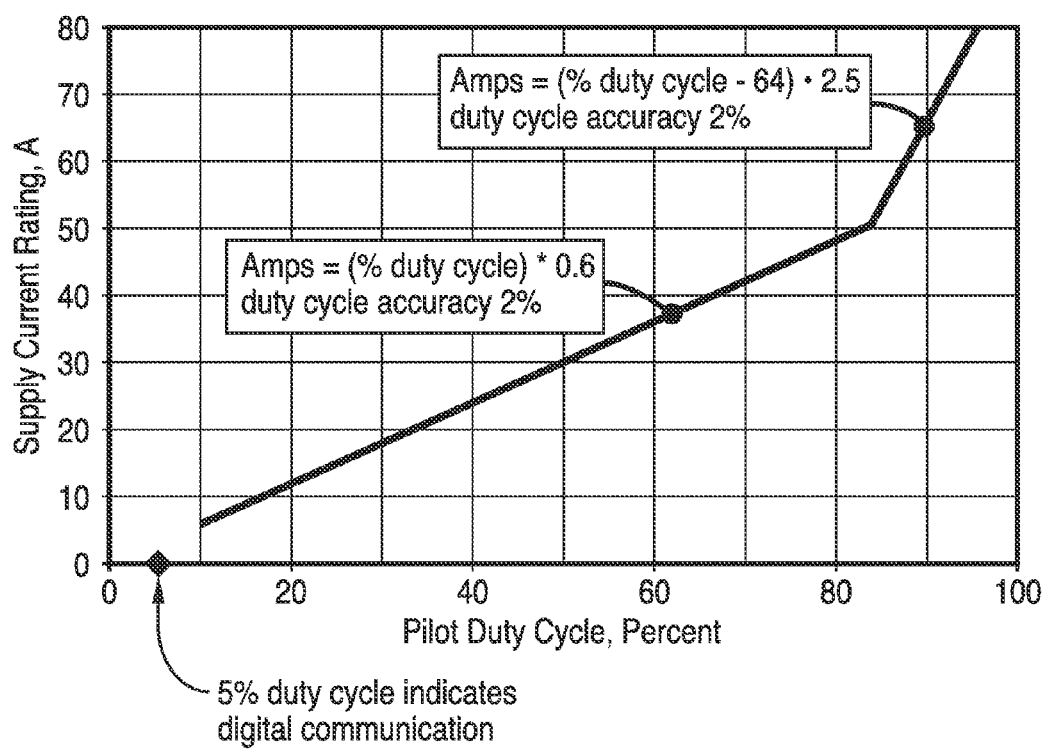
FIG. 4 is graph of supply current with respect to pilot duty cycle according to an embodiment of the present invention.

FIG. 4 depicts EV charging which shows supply current rating versus the pilot signal duty cycle, which is in a percentage. In the upper portion of the curve Amps=(percent duty cycle−64)*2.5, while in the lower portion of the curve Amps= (percent duty cycle x=0.6. The graph of FIG. 4 depicts duty cycle to about 2% accuracy.

2.2.1 Pilot Signal Generator and Monitor.

The pilot signal monitor and generator play a key role in the control unit of the smart charging station. The pilot signal generator, generates four PWM signals, such as in response to programming executing on a processor, for example in a MSP430 processor within a CC2530ZNP ZigBee end device.

FIG. 5A illustrates an example embodiment of firmware flow within the pilot signal generator. Execution starts 110 and then performs initializing 112 of the hardware and Zig-Bee interface. After this initialization four PWM signals are generated 114 by using two internal timers at the startup process, after which the top 116 of a main loop 134 is reached. Within the main loop 134, messages from the ZigBee chip are shown being polled 118. It should be appreciated that interrupts or other mechanisms may be alternatively utilized for collecting ZigBee messages depending on the hardware-firmware combination. A message is collected 120 and a check made 122 if it is a duty cycle change message. It will be noted that a change in duty cycle changes the PWM signal, and thus signifies a change in the allowable charge current by the EV. If duty cycle is to change, then a change is made 124 to the pilot signal duty cycle. If this is not a duty cycle change, then the check is made 126 for other commands. At least certain of these commands are passed 128 to the pilot signal monitor (e.g., the Arduino processor board). A check is performed 130 for a return value from the pilot signal monitor, and if a value is returned then this value is sent 132 to the ZigBee coordinator. After these actions, a return is made to the top of the main loop 116.

FIG. 5B illustrates an interrupt service routine being entered 140 in response to communication received from the pilot signal monitor (e.g., RS-232 serial input). A check is made of the return value from the pilot signal monitor 142, and the service routine ends 144 with a return made to the main loop.

According to SAE J1772, EV plug-in status is detected with the pilot signal generated in the charging station. When there is no EV connected to the charging station, the voltage of the pilot signal pin on the handle should be DC +12V. After the user plugs-in the EV, the voltage of the pilot signal pin should be +9V or +6V, depending on whether the EV is ready to accept the energy or not. The charging station will start to generate the pilot signal with a certain duty cycle according to the power capacity of the charging station. It will be noted that the original single EV charger is typically configured to generate a fixed PWM based on its current rating in level 1 or level 2, while the present invention varies the amount of allowable charging current between multiple connected EVs based on current available, user preferences, and toward providing grid-friendly operation. When the EV is fully charged, the positive part of the pilot signal will be from +6V to +9V. When the user unplugs the EV, the positive part of the pilot signal will be from +6V to +12V. Table 1 depicts the states according to the SAE J1772 standard.

Figure 6A:
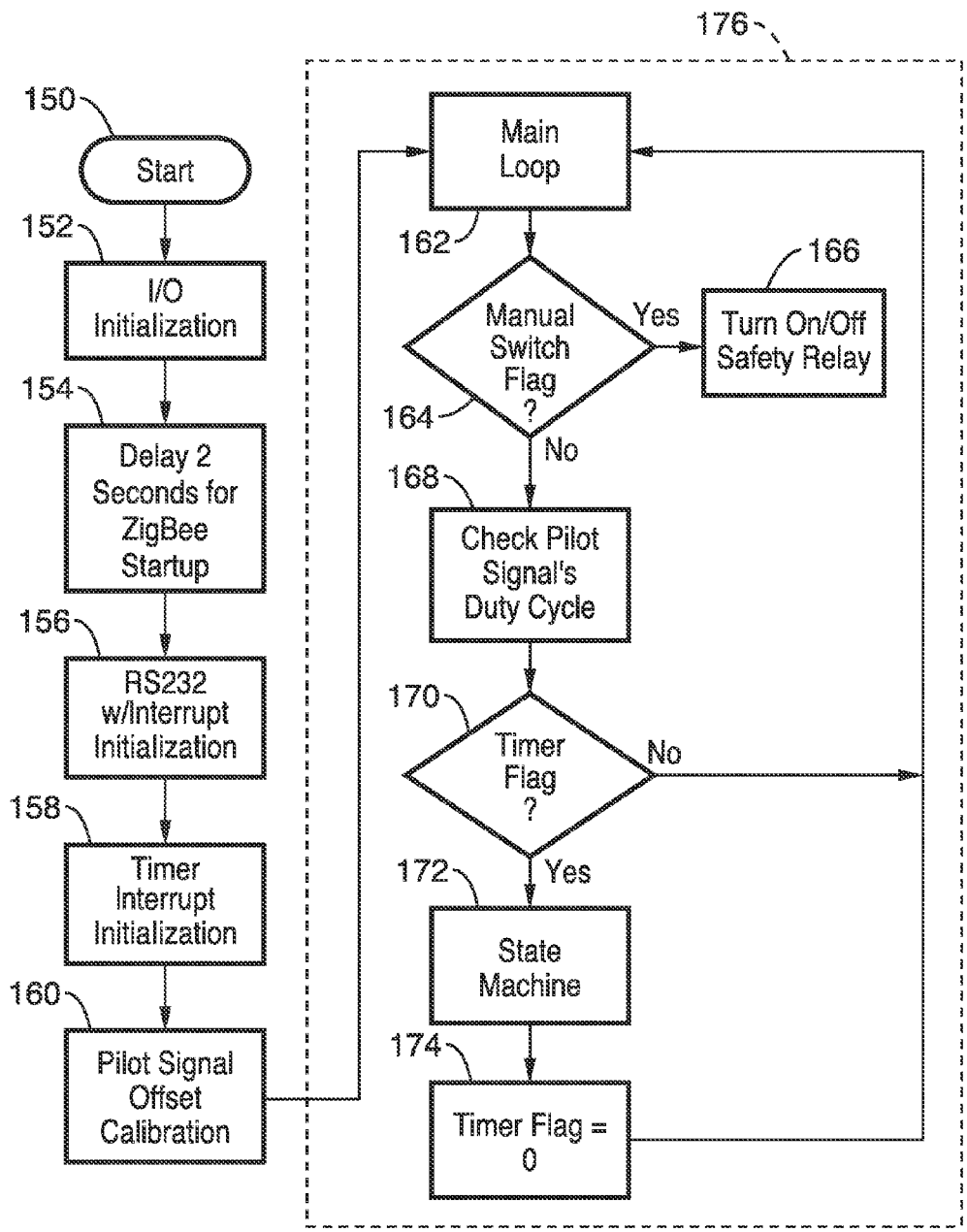
FIG. 6A through FIG. 6C are flow diagrams of pilot signal monitoring according to an embodiment of the present invention.
Figure 6B:
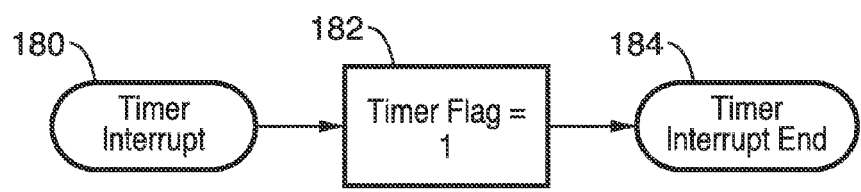
Figure 6C:
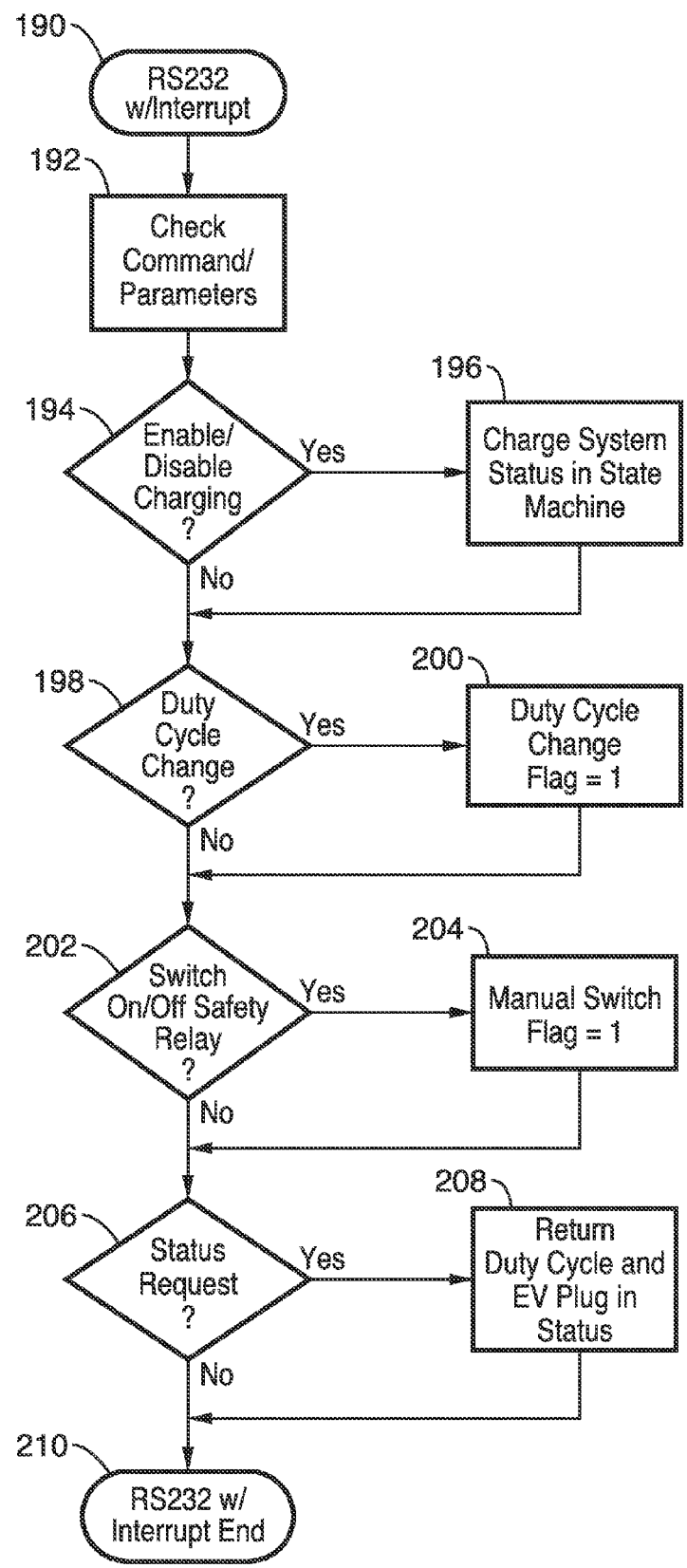

FIG. 6A through FIG. 6C illustrate firmware flow for the pilot signal monitor. Messages (e.g., RS-232) being received from the pilot signal generator (e.g., MSP430 of CC2530ZNP) are handled by an interrupt loop; so that the messages are not missed, or overwritten, while executing other processes in the main loop. The actions include check for commands, flag setting, and message return are handled in the interrupt loop. Most of the actions are handled in the main loop according to the flags to minimize service routine execution times, and thus interrupt latencies. Utilizing the timer interrupt, it will be appreciated that routine service, such as checking for EV existence and turning the safety relay on/off, will have essentially exact intervals. Moreover, without re-flashing the firmware, the execution interval of the timer service routine can be changed remotely, which makes the service more flexible. In the timer interrupt routine only the timer flag is seen being handled, instead of handling the actual services. The reason for this is that, if services are fully handled in the timer interrupt routine, the required execution time within the timer interrupt service routine would increase dramatically, and create latency issues for other interrupts, such as the communications interrupt which could then drop (miss) characters leading to unreliable communication. Accordingly, only a very few processor commands are executed during the timer interrupt routine. The organization of the firmware is flexible to allow adding services since the firmware handles services according to the flags in the main loop.

In FIG. 6A execution commences 150 and initializations are first performed, exemplified as input/output (I/O) initialization 152, a delay 154 is performed for ZigBee startup, the interrupt is initialized 156 for communications with the pilot signal generator (e.g., over an RS-232 serial interface), the timer interrupt is initialized 158, and a pilot signal offset calibration is performed 160. It will be appreciated that the present invention utilizes firmware generated pilot signals and can be configured to calibrate any desired parameters of the pilot signal to assure any desired level of accuracy.

The top 162 of the main loop 176 is reached and a check made for the manual flag switch 164. If the manual flag is set, then the safety relay state is turned on or off 166. A check is made 168 of the pilot signal duty cycle with the time flag checked 170. If the next time interval has not been reached, then execution returns to the top 162 of the main loop 176. If the next duty cycle time has arrived, then the state machine is updated 172, the timer flag is reset 174, and execution returns to the top 162 of the main loop 176. The EV plug-in status detection is executed in the state machine 172 of EV charging procedure.

In FIG. 6B entry is made 180 to the timer interrupt service routine, where the timer flag is set 182, after which a return is made 184 from the interrupt service routine. The detection of EV plug-in status is handled with the timer flag, as seen in 170 of FIG. 6A, after which the timer flag was reset to 0. By way of example and not limitation, the interval of the timer interrupt has been set in this example to 1 second in the firmware, which means the detection process is handled every 1 second. Note that the detection process time needs to be less than the interval of the timer interrupt so that the detection process can be handled correctly.

In FIG. 6C a communications service routine is exemplified, such as for an RS-232 interface used in this example embodiment. It will be noted that all the interrupts were initialized at the startup process in FIG. 6A. RS-232 activity is used to trigger the interrupt which is serviced 190 with a check for commands or parameters 192. If it is determined 194 that the command is to enable or disable charging, then charge state is changed 196 by the state machine. If it is determined 198 that the duty cycle (i.e., maximum allowable charge current to an EV) is to be changed, then a duty cycle change flag is set 200. If it is determined 202 that the command is for the switch on/off safety relay, then a manual flag switch is set 204. If it is determined 206 that the command is a status request, then duty cycle and EV plug status are returned 208. After all of these checks and possible actions, the service routine is completed 210 and execution returns to the main (FIG. 6A).

It should be appreciated that the RS-232 interrupt service routine could be alternatively configured to just service an incoming buffer and outgoing buffer, and set flags to the main loop. For example, upon receiving a character it would simply buffer it into the incoming buffer and move the pointer forward, then flag the main loop of a character received. Similarly, after sending a character from an output buffer (e.g., terminated with EOF character), it would move the pointer to the next character position and flag the main loop that the character was sent. This would allow supporting a more complex command structure without creating interrupt latency issues. The main loop could in multiple places check for these flags as desired to reduce service delays. One of ordinary skill in the art will appreciate that the specific programming for carrying out the described functions of the invention can be performed in innumerable ways without departing from the teachings of the invention.

Figure 7A:
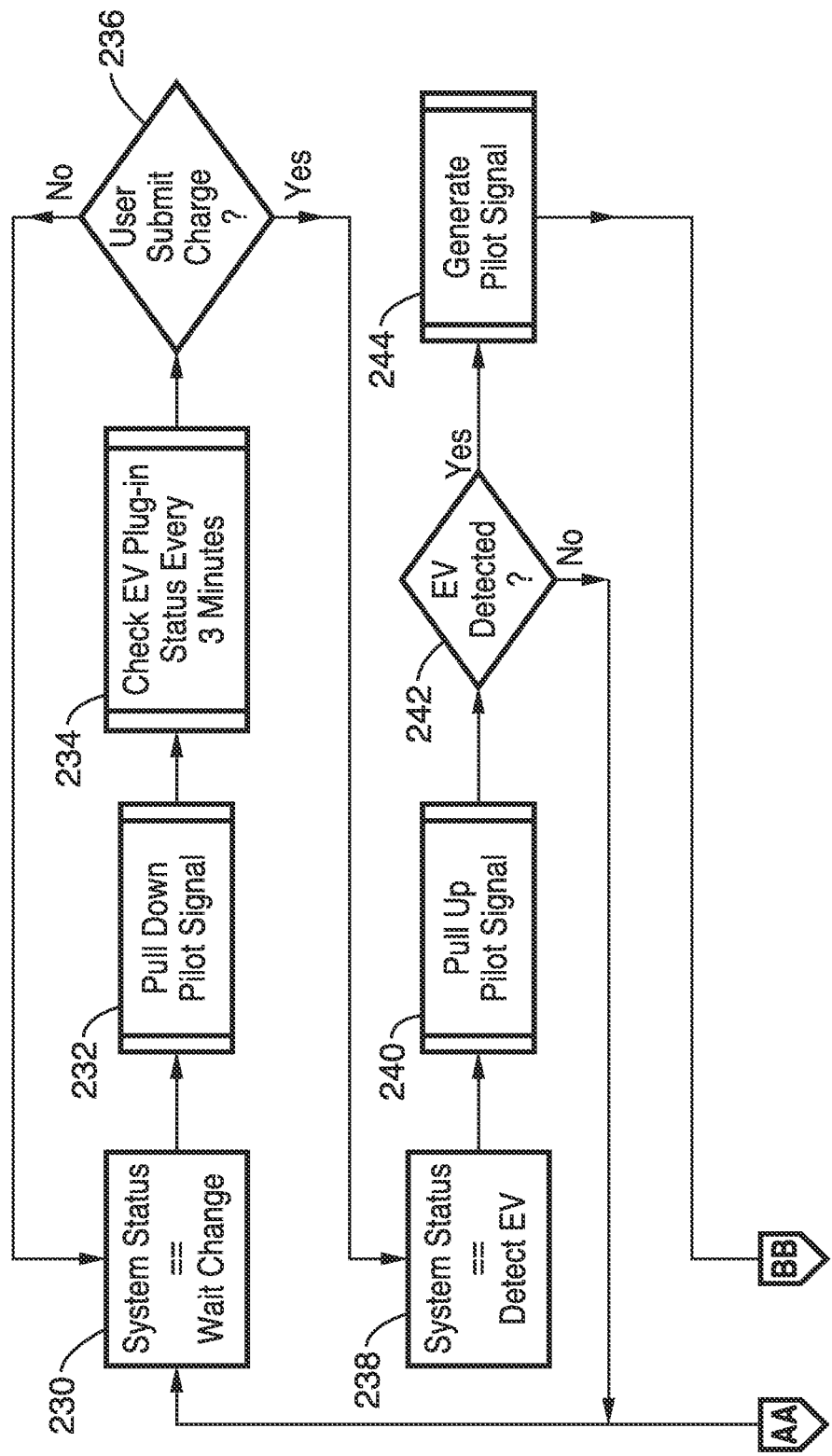
FIG. 7A and FIG. 7B is a flow diagram of a high level state machine for controlling charging according to an embodiment of the present invention.
Figure 7B:
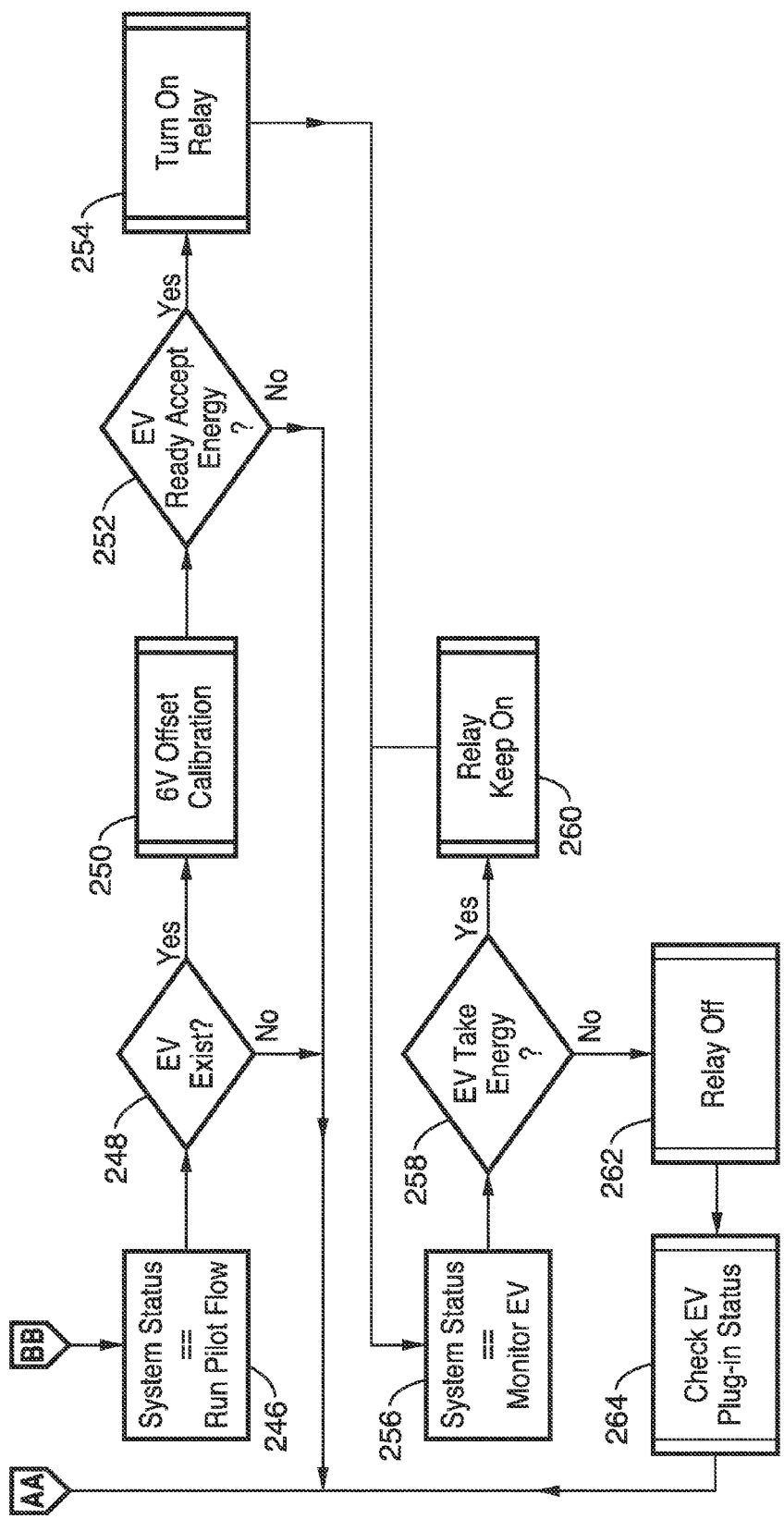

FIG. 7A and FIG. 7B illustrate firmware flow for a charge state machine. It will be appreciated that a state machine is a simple means of controlling a system whose operations are easily characterized into a defined set of states, although other programming constructions may be utilized without departing from the teachings of the present invention.

The state flow is seen showing four states on the left side with the steps performed for that state extending to the right of the state (and down in the last state). At the system state of "Wait Charge" 230 in FIG. 7A, the pilot signal is pulled down 232 and EV plug in status is checked 234 periodically (e.g., every three minutes). It is determined 236 whether the user has submitted a charge operation. If the user submitted charge has not occurred, then a return is made to block 230 and this waiting for charge state continues.

If, however, the user has commenced charging the EV as detected 236, then execution branches into the "Detect EV" state 238. The pilot signal is pulled up 240, and it is determined if the EV is detected 242. If no EV is detected, then a return is made to "Wait Charge" state 230, otherwise the pilot signal generation commences 244, and system state is advanced to "Run Pilot Flow" 246 in FIG. 7B.

In the "Run Pilot Flow" state 246, it is determined if the EV exists 248. If the EV is not seen, then a return is made again to the "Wait Charge" state 230. Otherwise, if the EV is detected, then a 6V offset calibration is performed 250, and a check is made 252 if the EV is ready to accept charging energy. If the EV is not ready to accept charge, then a return is made to the "Wait Charge" state 230. But if the EV is ready to accept the charge, then the relay is turned on 254, and system state is advanced to the "Monitor EV" state 256.

In the "Monitor EV" state 256 a check is made if the EV is accepting energy 258. If it is accepting energy, then the safety relay is kept on 260, and a return is made back to the start of this state 256. Otherwise, if conditions have changed and the EV is not accepting a charge, then the safety relay is turned off 262 (reset), a check made of EV plug-in status 264 and a return back to the "Wait Charge" state 230.

Figure 8A:
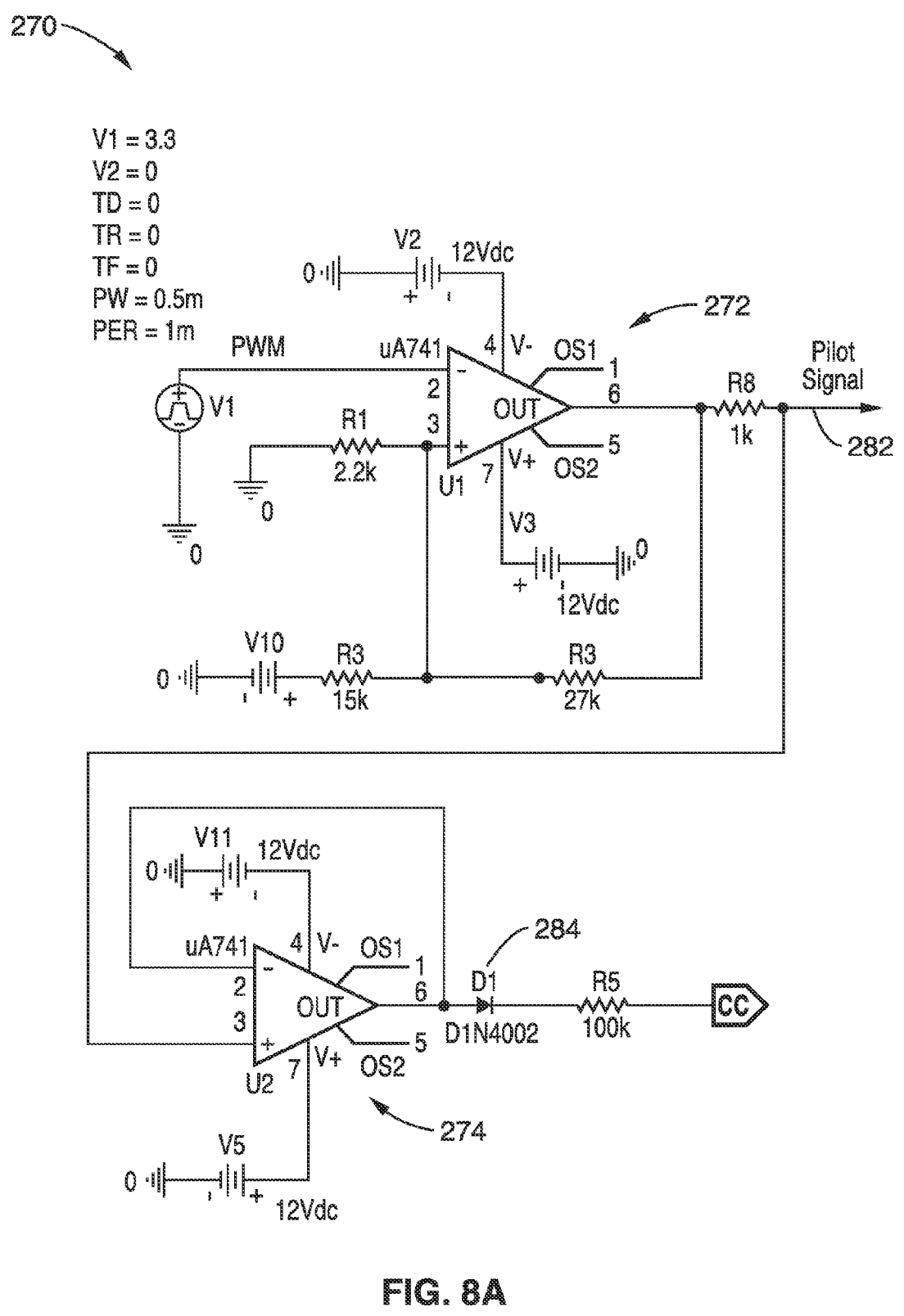
Figure 8B:
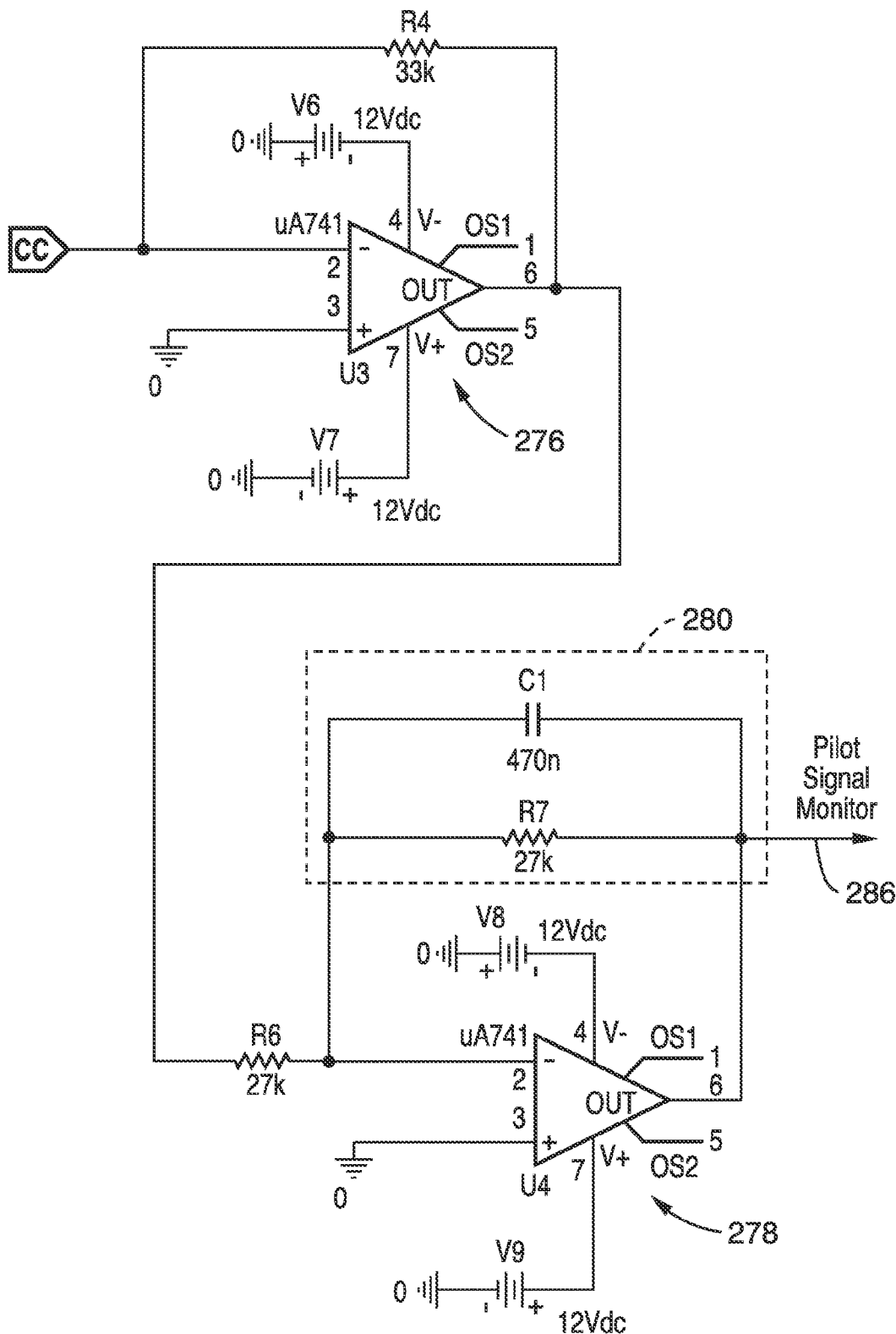

FIG. 8A and FIG. 8B illustrate an example embodiment 270 of a peripheral circuit having four 4-channel amplifiers to implement each channel of the 4-channel pilot signal generator and monitor. The PWM signal V1 generated by the pilot signal generator is amplified from 3.3V/GND to plus and minus 12V by the Schmitt trigger implemented with amplifier device 272 in FIG. 8A and fed to the EV as pilot signal 282. Output from the Schmitt trigger is received by a unity gain buffer, using amplifier device 274 for separating the circuits so that the pilot signal monitor can monitor the pilot signal without adding load effect to the pilot signal. It should be noted that a Schottky diode 284 is inserted after the unity gain buffer 274 because only the positive part of the signal will be monitored. To shrink the pilot signal to the A/D conversion range, an inverting amplifier 276 in FIG. 8B is seen exemplified with ⅓ gain. The peak value detection method is not utilized because it tends to be affected by unexpected spikes which make the measurement unreliable. Instead, an inverting active low pass filter (LPF) 278 with RC feedback network 280 is used to average out the output pilot signal 286 such that a DC voltage can be measured by the pilot signal monitor. In certain embodiments additional pilot signal buffering may be incorporated to make the output more robust.

Figure 9A:
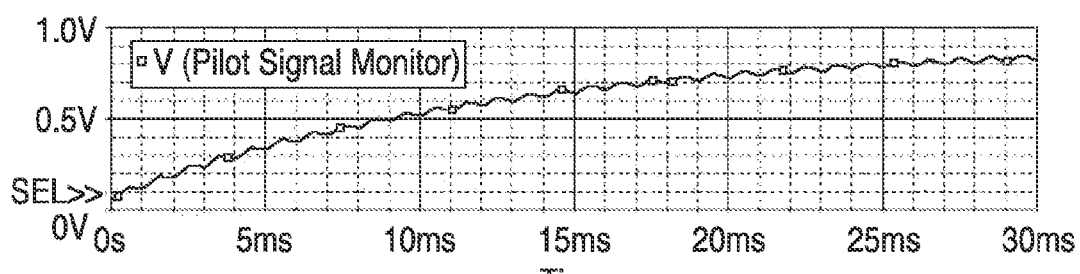
FIG. 9A through FIG. 9C are graphs of simulated pilot signals according to an embodiment of the present invention.
Figure 9B:
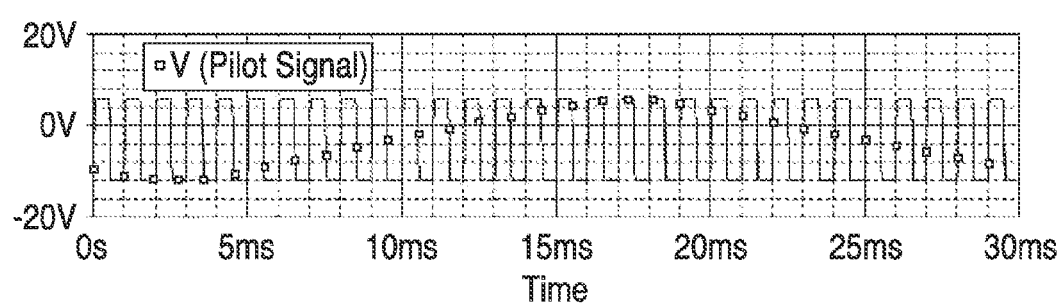
Figure 9C:
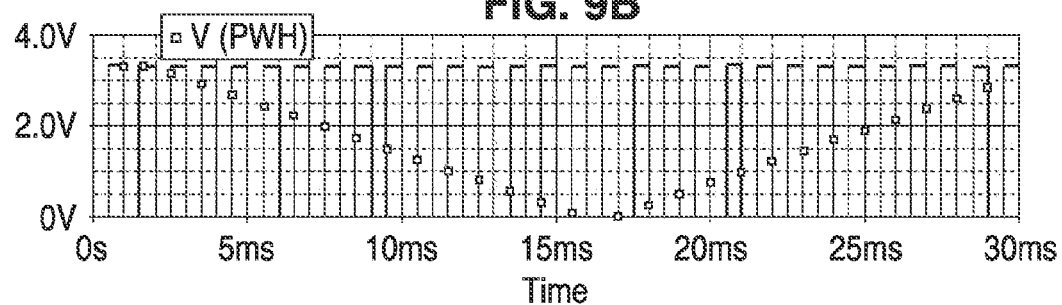

FIG. 9A through FIG. 9C illustrate PSpice simulated signals for these peripheral circuits. FIG. 9A depicts the signal at the pilot signal monitor. FIG. 9B depicts the pilot signal to the EV. FIG. 9C depicts the PWM from MSP430. The simulation shows that it takes around 30 ms to reach the steady state. This value needs to be compensated in the pilot signal monitor firmware.

2.2.2 ZigBee Coordinator.

One of the major functions of the ZigBee coordinator is handling (coordinating) messages between the gateway and the end devices. For example, each time a ZigBee end device joins the mesh network, the coordinator will assign a 16 bit dynamic address to it. In order to pass the command and parameters from the gateway to the desired destination, the ZigBee coordinator recognizes and registers the unique MAC address of the ZigBee end devices.

FIG. 10A and FIG. 10B illustrate firmware flow of a CC2530ZNP with Max3232 as the ZigBee coordinator. In FIG. 10A the coordinator programming commences 310 and initialization is performed 312 of the hardware and ZigBee interface before reaching the top 314 of a main loop 336. In this loop a message is polled from the ZigBee module 316 and registration of the ZigBee end device is performed 318. The ZigBee message is checked 320, and if it is determined 322 to be a message from the ZigBee end devices, then the message is passed to gateway 324. If it is not a message from the ZigBee end devices, then a check is made 326 if it is a command from the gateway. If it is a command from the gateway, then the command is sent 328 to the ZigBee end devices; otherwise a return is made to the top 314 of the main loop.

In FIG. 10B the communication interface interrupt service routine is shown commencing 330, checking commands and parameters from the gateway 332 and returning 334 to the main execution.

2.2.3 Server Operation.

Figure 11:
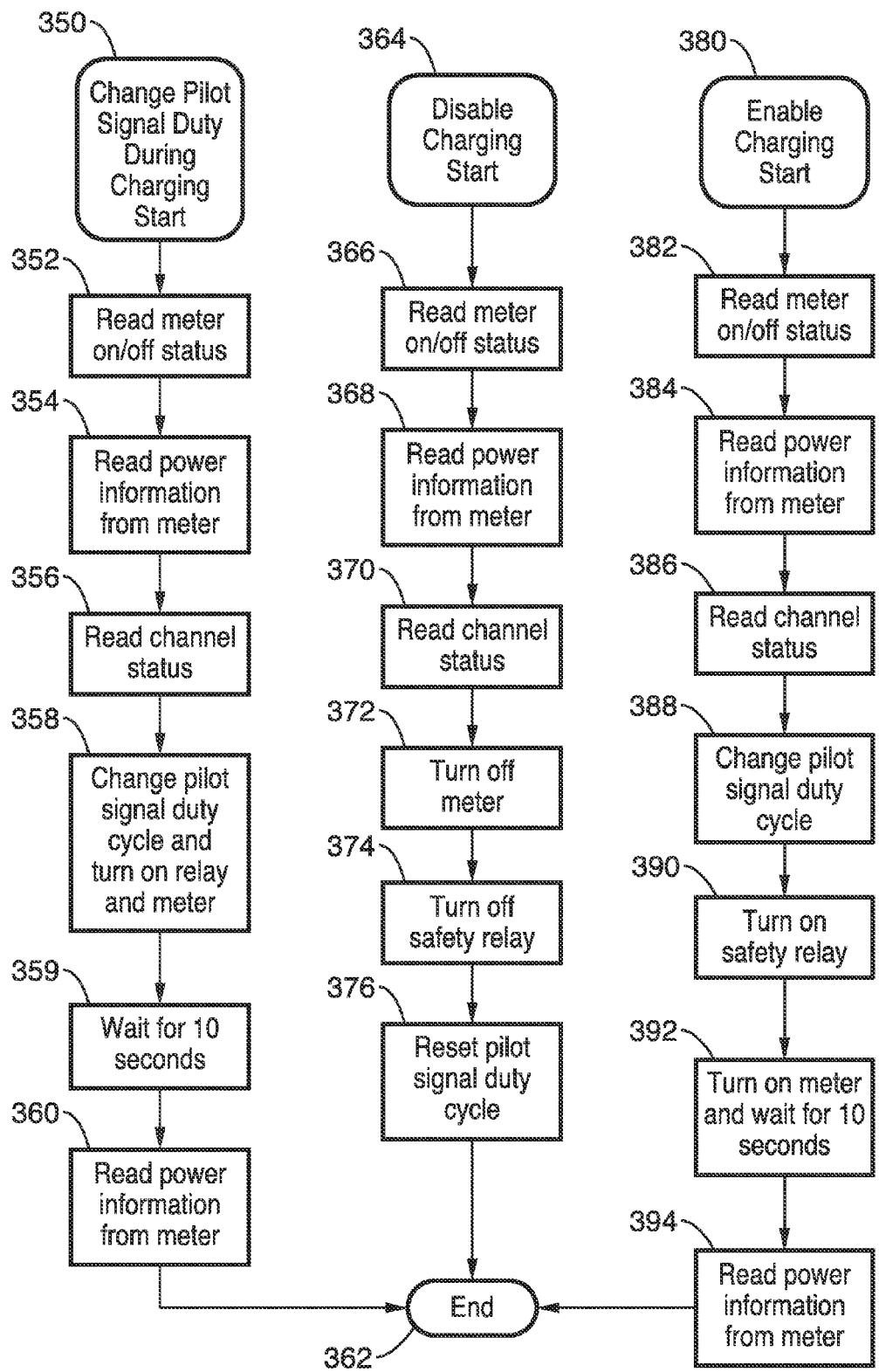
FIG. 11 is a flow diagram of server operation according to an embodiment of the present invention.

FIG. 11 illustrates an example embodiment of server operation flow including changing pilot signal duty cycle during charging, disabling charging and enabling charging. In each routine, three processes are performed including read meter on/off status, read power information from the meter, and read channel status. The return values of power information from the meter are voltage, current, and active power while the return values of read channel status are pilot signal duty cycle, safety relay on/off status, EV plug in status, and error status.

In particular, the routine is entered 350 for changing pilot signal duty cycle with the reading of meter on/off status 352, then power information 354, then read channel status 356. In response to this information, a command is sent out to change pilot signal duty cycle 358, and thus the allowable EV current, and assuring activation of the safety relay and turning on the meter. A wait is then performed 359, such as of 10 seconds, followed by reading power information 360, after which the routine ends 362.

If the routine for disabling charging 364 is executed, then a read is again performed on meter on/off status 366, then power information 368, then read channel status 370. The server then turns off the meter 372, turns off the safety relay 374, and resets 376 the pilot signal duty cycle.

The enable charging routine is entered at block 380, and reads are performed on meter on/off status 382, then power information 384, and then on read channel status 386. After this, a command is sent to change pilot duty cycle 388, the safety relay is turned on 390, and the meter is turned on 392 including a desired delay, such as of 10 seconds. After the delay, power information is read from the meter 394 and the routine ends 362.

The following format of command is used to send the request to the charging station:

comd [command] [channel] [parameter].

The description of commands and return values of the charging station are summarized in Table 2. The return values in the table are in the format of duty[channel][value], rely [channel][value], plug[channel] [value] [stat[channel] [value]. The value of 'duty' means the duty cycle of the channel. The value of 'rely' means the on/off status of the relay. The value of 'plug' means the EV plugin status (1 means ON and 0 means OFF). The value of 'stat' means the status of the state machine in the flow chart.

3. Operational Tests Results

A set of operational tests were conducted to measure EV response time to the pilot signal change command. The testbed was a Nissan Leaf with a 110V charging cable. To insert and swap our pilot signal with the original signal from the charging cable, a J1772 adaptor was made. (e.g., EV emulator connected to original pilot signal from the charging cable, with new pilot signals generated by the invention, with each new pilot signal coupled into each of the multiple charging cords.)

Figure 12:
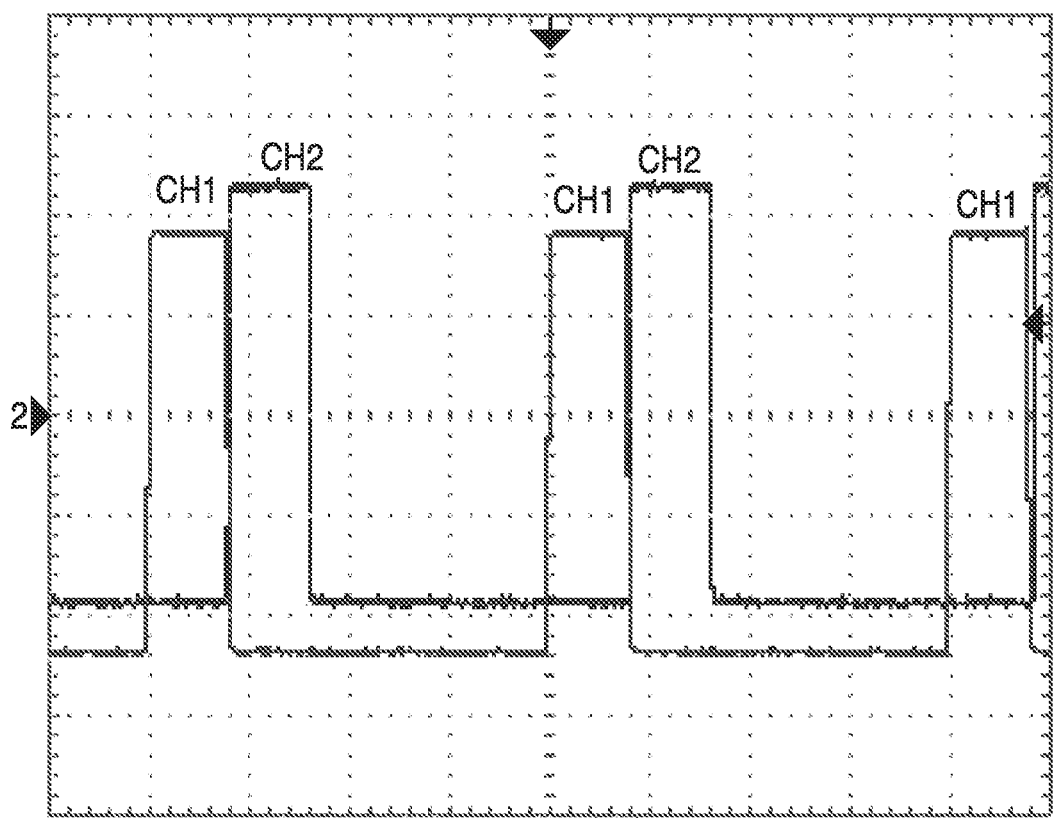
FIG. 12 is a graph of pilot signals according to an embodiment of the present invention.

FIG. 12 depicts a comparison between the original pilot signal, shown with a first vertical peak at far left (CH1); and the pilot signal according to an initial prototype of the present invention, shown with first peak just right of the original pilot signal and a higher baseline (CH2). The frequency of our pilot signal (994 Hz) is in the range of the J1772 specification (980~1020 Hz). The rise time (3.9 uS) and the fall time (3 uS) of our pilot signal are slightly over the values specified in J1772 (2 uS). However, compared with the pilot signal of commercial charging cable, our prototype pilot signal in both cases provides improved rise and fall times, which means the signals of the present invention will work with commercial EV installations. One of ordinary skill in the art will also appreciate that signal envelope rise and fall times are easily manipulated by changing the pilot amplifier circuits or providing additional buffering thereof.

Figure 13:
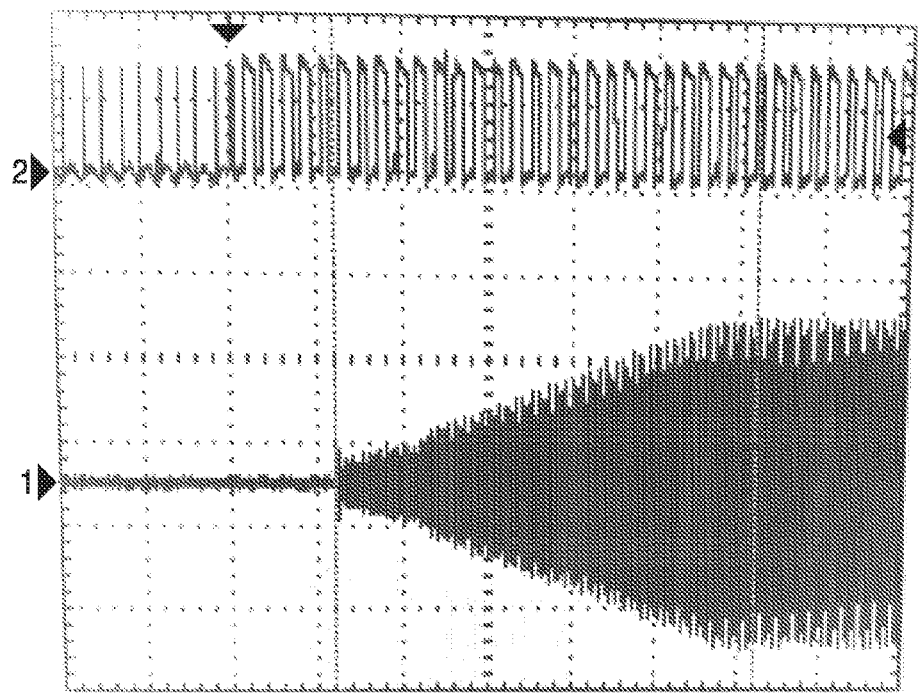
FIG. 13 through FIG. 16 are graphs of high-low current switching across four different amperage ranges according to an embodiment of the present invention.
Figure 14:
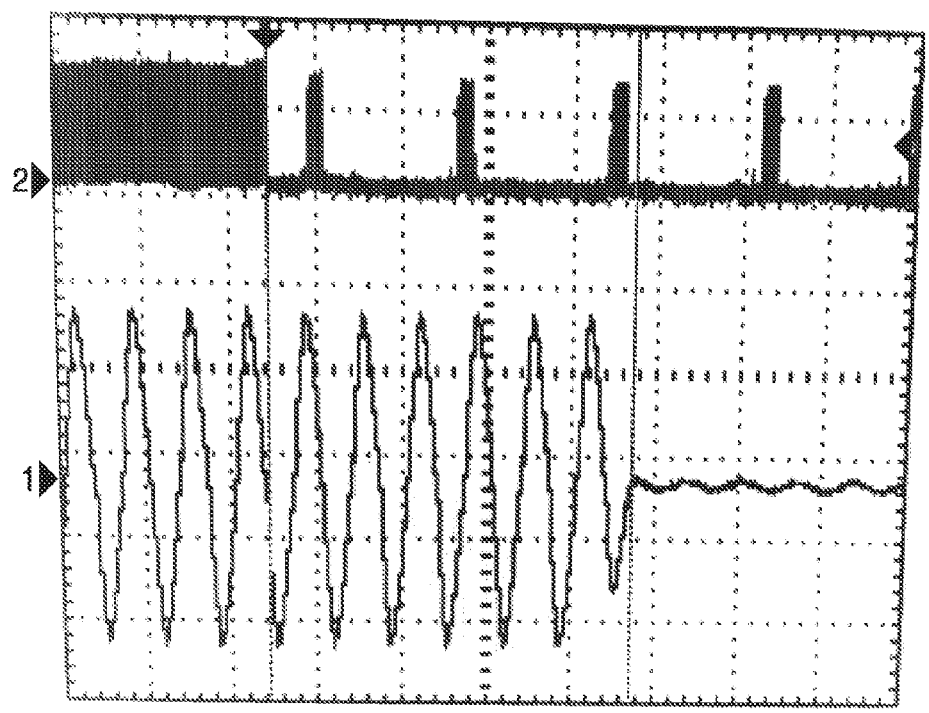
Figure 15:
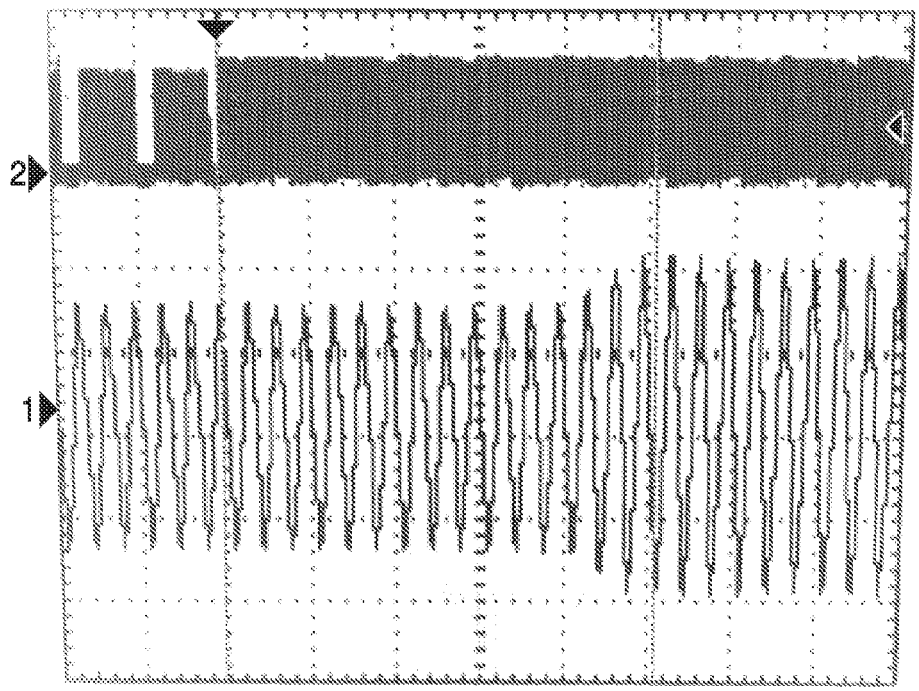
Figure 16:
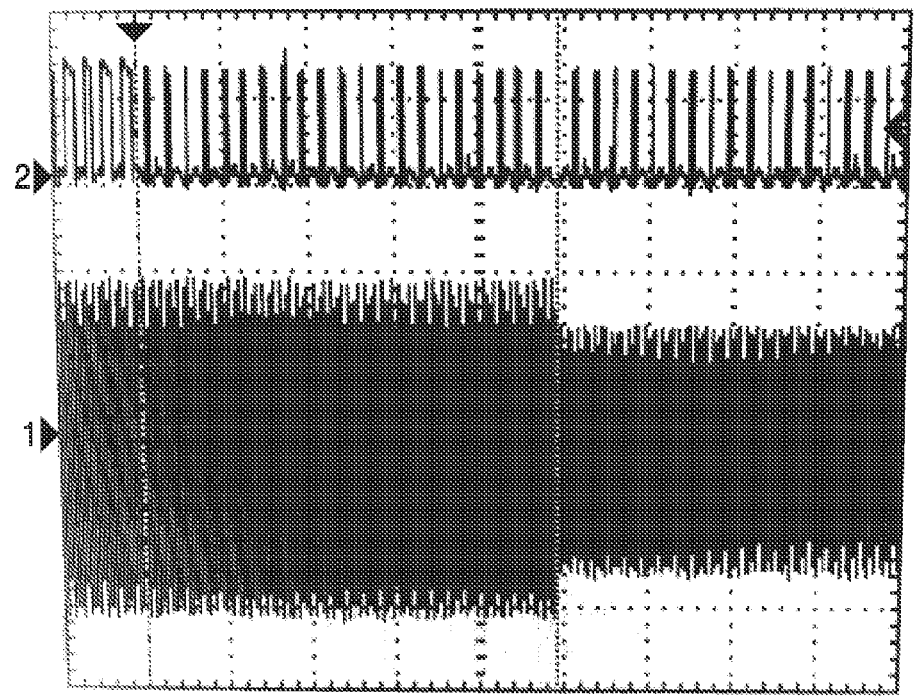

FIG. 13 through FIG. 16 depict four current switching cases which were tested, with 0 A to 12 A switching seen in FIG. 13, 12 A to 0 A switching seen in FIG. 14, 8 A to 12 A switching seen in FIG. 15 and 12 A to 8 A switching seen in FIG. 16.

It should be noted that in Level 1 (110V) charging, even though the server sets the duty cycle larger than 20%, which makes the maximum current capable of being larger than 12 A, the Nissan leaf will only take 12 A. Here the time value $T_{EvExe}$ is defined to be the time between the EV receiving the command and it starting to change the current. The time value $T_{Ev\,Resp}$ is defined to be the time between the EV starting to change the current and when that current level has settling down. The time value $T_{EV}$ is the summation of $T_{EvExe}$ and $T_{EV\,Resp}$ which can be expressed in Eq. (1) below:

$$T_{EV} = T_{EvExe}(I_{init}, I_{final}) + T_{Ev\,Resp}(I_{init}, I_{final}) \quad (1)$$

The results of these tests are summarized in Table 3. It will be appreciated that in these tests the time required for $T_{EvExe}$ and $T_{Ev\,Resp}$ are related to both the initial current $I_{init}$ and final current $I_{final}$.

In the case of $I_{final}=0$ A, $T_{EvExe}$ is 100 ms and $T_{Ev\,Resp}$ is 10 ms, which are relatively faster than other cases. It is possible that the EV could turn off its switch in 100 ms without changing its load and 10 ms is the transient response to 0 A. In the case of $I_{init}=0$ A, $T_{EvExe}$ is 1000 ms and $T_{Ev\,Resp}$ is proportional to the final current. It is possible that the EV turns on its switch in 1000 ms and starts to consume a current proportional to the final current. In the case of $I_{init}=12$ A and $I_{final}=8$ A, $T_{EvExe}$ is 5000 ms. It is possible that the EV's battery management system needs to balance the battery cells and then change its load.

4. Timing Analysis Discussion

The timing of the whole system can be further analyzed to improve performance. The time required for returning of changing duty cycle $T_{Return}$ can be expressed in the following equation:

$$T_{Return} = T_{ControlUnit} + T_{GatewayServer} \quad (2)$$
$$= T_{ZigBee} + T_{3GUplink} + T_{Cloud}$$

Letting $T_{waiting}$ be the waiting time after receiving the successful return of pilot signal duty cycle change and before sending the power information request. The waiting time $T_{waiting}$ at server side plug $T_{Return}$ is required to be greater than $T_{EV}$, which can be expressed in the following equation:

$$T_{Return} + T_{waiting} \text{ is } \approx (T_{ZigBee} + T_{3GUplink} + T_{Cloud}) + T_{waiting} \approx \quad (3)$$
$$T_{3GUplink} + T_{Cloud} + T_{waiting} > T_{Ev} =$$
$$T_{EvExe}(I_{init}, I_{final}) + T_{EvResp}(I_{init}, I_{final})$$

We can rewrite Eq. (3) as the following:

$$T_{waiting} > T_{Ev} - T_{Return} \approx \quad (4)$$
$$T_{EvExe}(I_{init}, I_{final}) + T_{EvResp}(I_{init}, I_{final}) - (T_{3GUplink} + T_{Cloud})$$

So from Eq. 4, we can see that $T_{waiting}$ depends on $I_{init}$, $I_{final}$ and the communication traffic. To speed up the system performance, $T_{waiting}$ can be set to be various values depending on $I_{init}$, $I_{final}$ rather than a fixed value.

5. Additional Embodiments

The smart EV charger of the present invention provides additional benefits for charging more than one EV from a charging station. In this embodiment, a smart charging box architecture is described which provides power to several EVs charging from one circuit with different duty cycles (e.g., specified maximum allowable EV charge current) and different yet, controllable power levels for each EV. This also allows for a safe multiplexed form of parking area charging system that is far less expensive and thus not limited to a few designated EV charging spots.

The objective of the variable control scheme is to gather information about the EV and EV user, then provide power to that EV in the most efficient way possible while adhering to user preference and local grid power needs. It can automatically charge the EV through scheduled charging and can charge using any desired form of current sharing. With the system's management and control, a reliable and stable structure can be built to help provide effective charging to lower the local power grid load curve. The EV control schemes integration with WINSmartEV can help solve a shortage of energy availability in a local grid by reducing charge rates during peak energy hours, or even sending power from the EV back onto the grid.

Unique features of this variable power control embodiment incorporate RFID EV user identification, or barcode charging station identification, while providing real-time charging, such as equal level 2 charging. Current control is described which allows for the charging box to change current limits communicated to any or all EVs connected to the system. Wherein, the current for one EV can be completely different from the next, although connected to the same charging box. These elements are particularly beneficial when implementing EVs into the power grid in a way that each EV can be charged to its maximum potential while responding to the demands and needs of the local power grid.

5.1. Level 1 and Level 2 Smart EV Charging with RFID.

Figure 17:
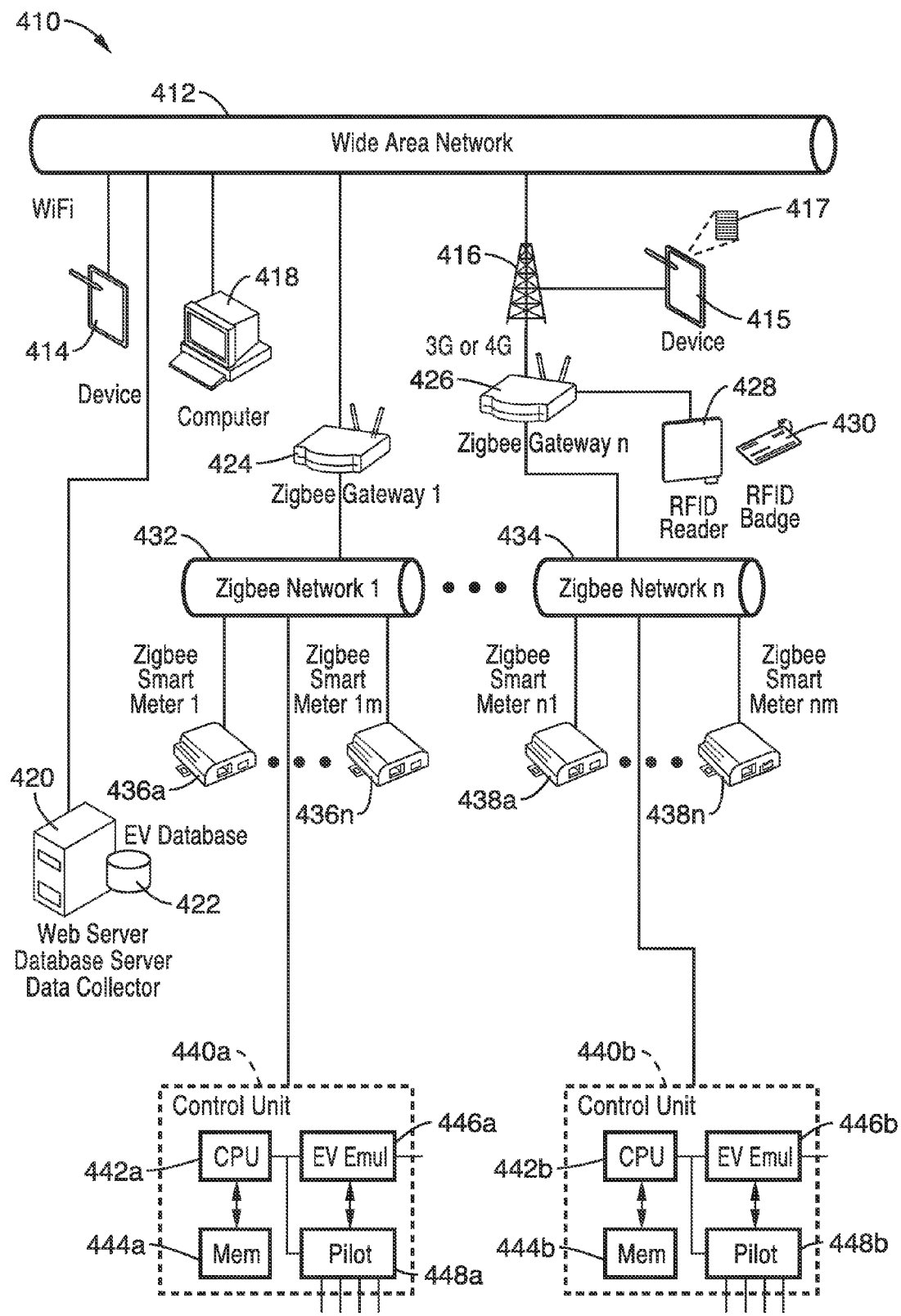
FIG. 17 is a block diagram of level 1 and level 2 EV charging according to an embodiment of the present invention, showing use of RFID.

FIG. 17 illustrates an example embodiment 410 of a smart charging communication infrastructure in which charging is controlled in response to RFID reading and remote user management, such as from a mobile phone. A wide area network 412 (e.g., the Internet, or a network covering a desired area (e.g., campus, business complex, and so forth) is shown over which a first portable device 414 (e.g., mobile phone, phablet, tablet, laptop, etc.) can communicate, such as using WiFi, or other wired or wireless protocol. In addition, a mobile device 415 may connect through a cellular network 416 to the wide area network 412. A server 420 with EV database 422 is connected to the network 412 for controlling EV charging in response to inputs from these portable devices and/or a computer workstation 418. The server authenticates users attempting to charge their vehicles at an identified charging station, and sends commands to the associated gateway to activate a charging session.

Communications for multiple charging stations are shown in the figure, each shown with a gateway connected to network 412 for communication with server 420 and its database 422. Gateway 424 is shown for a first charging station and gateway 426 is shown for an nth charging station. In this example embodiment, the gateways 424, 426 each connect with the lower level charging elements, such as smart meters 436a-436n and 438a-438n, over local ZigBee networks 432, 434. It will be appreciated that safety relays are considered in this figure to be part of the smart meter circuit, and thus not separately shown, for controlling power connection to the charge cords for each EV. One gateway 426 is also shown coupled to an RFID reader device 428 configured for reading an RFID badge 430.

Control units (e.g., coordinators) 440a, 440b are also shown with their computer processor 442a, 442b, memory 444a, 444b, which controls the low level aspects of charging. In each control unit, the computer processor is shown coupled to an EV emulator 446a, 446b having a single output, and a pilot signal section 448a, 448b, which generates and monitors four pilot outputs. The EV emulator and pilot signal generator are described in more detail in a later section.

In Level 1 and Level 2 charging, the EV user is capable of managing their EV charging via mobile phone. The EV user can sign in via internet to establish connection to the server. The server validates the user and handles any necessary payment transactions. Users may also set account and charging preferences on the server, and obtain account information including summarized charge usage and other details from the server.

In one element of this embodiment, the user may provide charging station identification, or more particularly identification of one of the multiple charge outputs from a given charge station, in response to scanning in a barcode 417 from their mobile device 415. In this way, the user need not type in a number from a charge cord, but can use the camera on their phone, such as within a charge request application of the server. After the user is validated, then charging can commence for the user's EV.

In another element of this embodiment, an RFID tag can be utilized to establish connection with the system, which can be used to eliminate the need for the user to login via a mobile device.

For example, the user can choose to login using an RFID badge 430. The user will still be capable of logging in via mobile device if preferred. The RFID badge 430 is read by the RFID reader 428, which will gather the EV user's information and preferences. This information will then be sent to the ZigBee gateway 426. The station controller and data collector retrieve this information from the gateway, store it in the system, and then dispose of it when it is no longer needed.

Figure 18A:
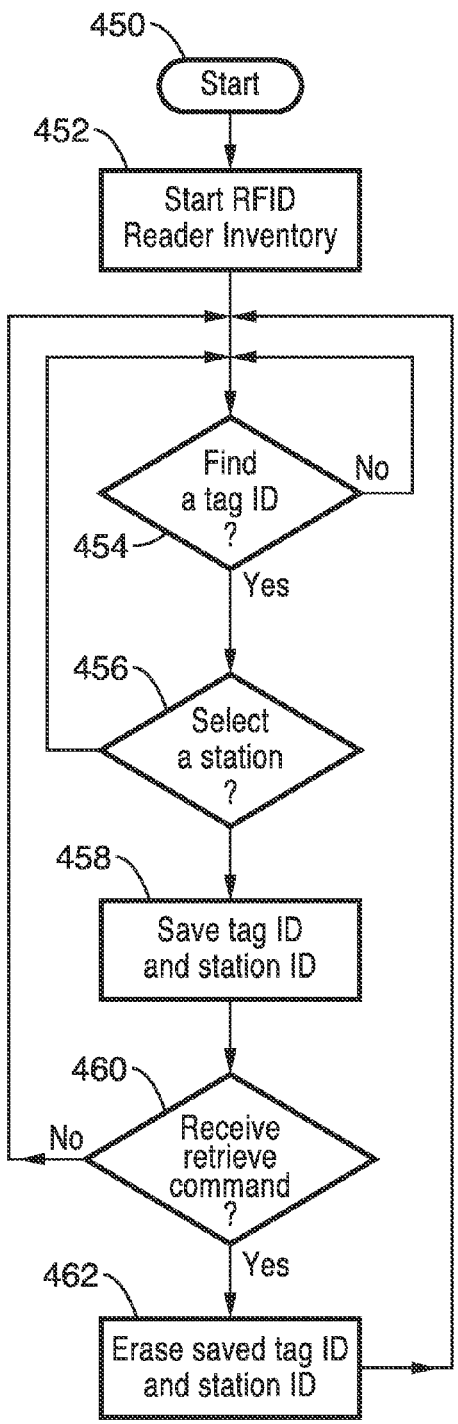
FIG. 18A and FIG. 18B is a flow diagram of level 1 and level 2 RFID charging according to an embodiment of the present invention.
Figure 18B:
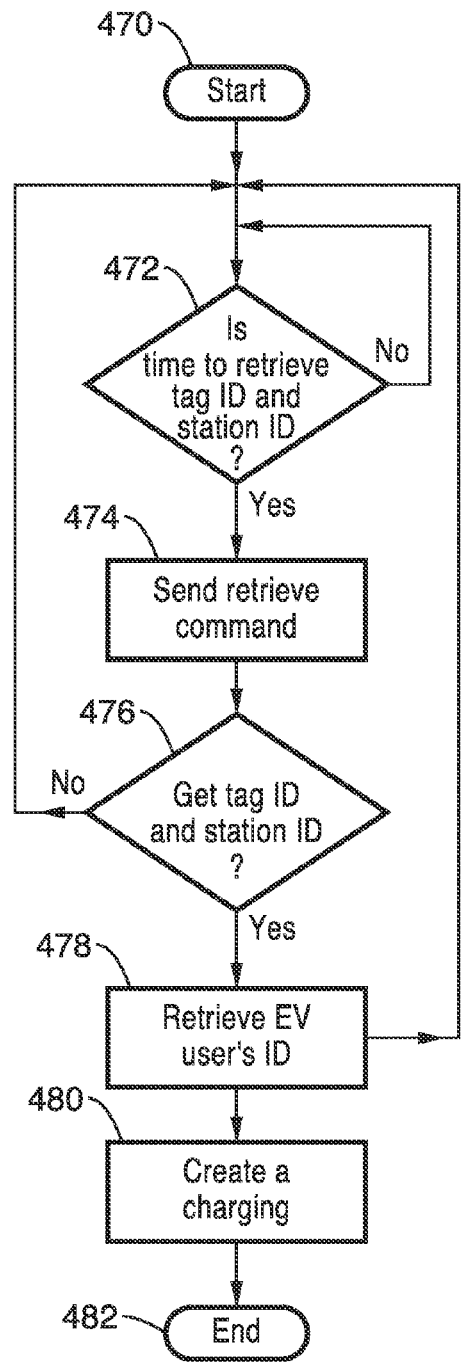

FIG. 18A and FIG. 18B illustrate an embodiment of level 1 and level 2 RFID based charging. In FIG. 18A, a charging station side routine commences 450 within an initialization that includes an RFID reader inventory 452 in which each reader is properly identified and logged in for use. In operation, the RFID readers keep checking for sensing a tag ID 454. Upon reading a tag they attempt to retrieve a station ID 456, and return to 454 is no station is selected. Upon retrieving tag ID and station ID they are saved 458. If a retrieve command is performed 460, with the data going to the server then the saved tag and station ID are no longer needed and are erased 462. If no retrieve command is received, then a return is made to RFID tag checking 454.

In FIG. 18B, a server side routine commences 470 and a check is made 472 if it is time to retrieve tag ID and station ID from the station. When the information is available, a retrieve command is sent to the station 474 and a check made if the tag ID and station ID are obtained 476. If not, then a return is made to determining if the tag and station ID are ready 472. Upon obtaining the tag ID and station ID, the EV user ID is obtained 478 by the server from the database, and a charging session commences 480 in response to the server sending a command to the charging station, whereupon this charge initiation process ends 482.

Figure 19:
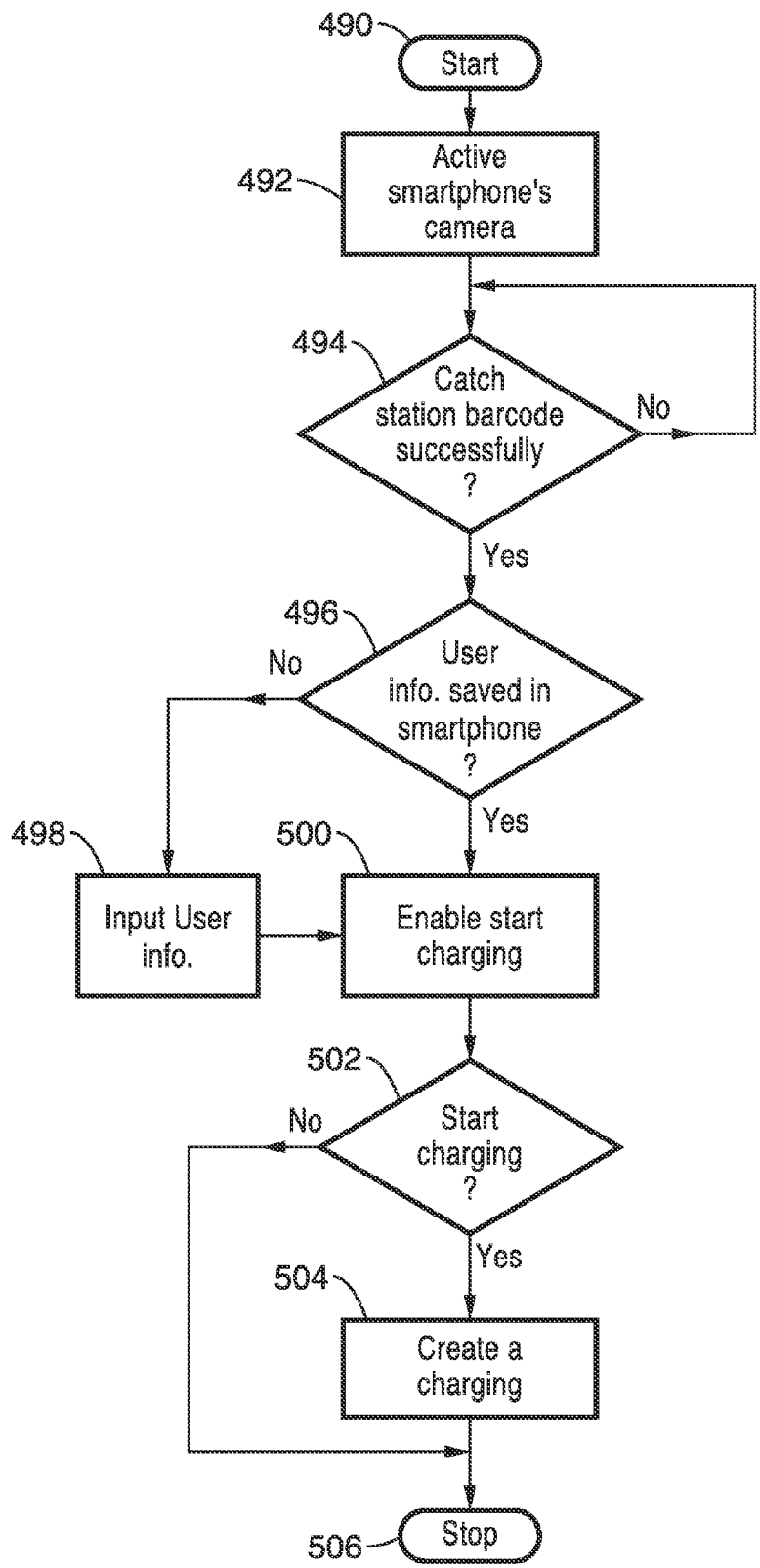
FIG. 19 is a flow diagram of 1D or 2D barcode charging according to an embodiment of the present invention.

FIG. 19 illustrates an example embodiment of programming on the mobile device (e.g., mobile phone) for commencing a charging session in response to scanning a 1D or 2D individual charging station bar code by the EV user. In this example, after parking at a charging station, the user scans a bar code (e.g., 1D or 2D barcode) from that station and the application communicates their user ID and the station ID to the server to start a charging session.

The routine commences 490 and the camera of the mobile device is activated 492, and a check is made 494 until a bar code is successfully captured. A check is made 496 if user information is already saved in the mobile device 496. If not, then the user inputs that information 498 for the server. Now with user and station information collected, the user is asked to select any options and commence charging 500. Once the user has prepared for charging, for example by establishing the charging connection, the user presses "submit" on the mobile device which is detected 502 as a command a start charging. If charging cannot be performed then the session ends 506, otherwise a charging session is performed 504.

Similarly, the system can be utilized so that an image is captured of a textual indicia (instead of bar codes) from the charger or charge cord to which optical character recognition is applied in determining the number. Optionally, the system in at least one embodiment displays the charge station identification to the user to verify before proceeding to establish a connection. In these ways the server can more readily and accurately obtain information about the charging station which is selected for use.

It will be appreciated that obtaining user and charge station information can be facilitated in other ways without departing from the present invention. For example, using Bluetooth or optical communication between charge station and mobile device.

5.2. Charging Box Information.

This embodiment of the current charging box has four outlets which allow for charging up to four EVs. Incorporated within this prototype of the charging box are a 12V adaptor, an outlet, a network gateway, four smart meters, four safety relays, a control unit, and a communications device (e.g., 3G dongle). It will be appreciate that four outlets are shown by way of example and that additional outlets can be provided as well.

The prototype charging box was built in a manner that the 12V adaptor is plugged into a power outlet for the control unit, thus no external power sources are required aside from the power available at the charging station. The gateway provides information to the ZigBee coordinator or if there is no other connection, the communication device (e.g., 3G dongle) is utilized for the gateway. The control unit provides commands and information to the server. Once charging commences, the smart meters read energy consumption of each EV being charged and send it for recording by the server. Safety relays are included in line with each charging cord that prevent or stop current from flowing if it does not detect presence of an EV, or if the EV is otherwise not appearing to perform charge operations properly.

5.3. Communication with Multiple Charge Boxes.

By way of example, and not limitation, a ZigBee coordinator provides communication connection to multiple charging boxes with the use of one router. The coordinator contains a ZigBee module that gathers and sends out commands and information from the charging boxes within reach of the wireless connection.

One example of a ZigBee coordinator comprises a USB port that connects to the gateway. The USB is preferably converted to an RS-232 serial port in order to send and gather any information from the ZigBee module. This port connects to the ZigBee module using an interface. A regulator is also contained within the charging box for converting 5V to 3.3V for powering control devices, including the ZigBee coordinator.

5.4. Control Unit.

In this embodiment, a control unit is located within each charging box to control the entire operation of the box and for communicating information back to the server while carrying out commands provided from the server. The control unit also provides safety features for the high voltage connection made to the EV. Each charging box preferably contains an EV emulator, microprocessor with pilot signal generator and ZigBee module, plug for the pilot signal generator cords, amplifiers, pilot signal monitor, plug for the safety relay cords, auto reset mechanism, interface for the pilot signal generator and pilot signal monitor, a relay driver, a power supply input, a −12V voltage converter (e.g., 555 timer used in a charge pump circuit), and a USB port. Optionally the charging box of the invention may contain a small battery so that the controller may still be operated even when the original single EV charging station has switched off its power output, thus allowing EV emulation to commence so that power is restored.

The microprocessor with pilot signal generator and ZigBee module provide for communication of information. The pilot signal generator is of most importance when implementing charge current control. The pilot signal generator, in this example, generates four pilot signals to four EVs through the charging plugs. The voltage converter is utilized to generate −12V from +12V which are then utilized by the amplifiers. Next, when an EV is connecting, a pilot signal is generated and monitored by the pilot signal monitor. The pilot signal monitor detects if the EV is plugged in or not. If the EV is properly plugged in, charging can occur. If the EV is not plugged in, or plugged in improperly, then the pilot signal monitor will prevent or otherwise stop all charging current by open circuiting the safety relay. The pilot signal generator and pilot signal monitor are connected through an interface.

This embodiment incorporates an auto reset mechanism, which allows an operator to reset the entire system wirelessly from the server by turning off the EV emulator which causes the normal charging station to turn off its output current. When switched back on, the EV emulator can then be detected again and therefore reset. In addition, the relay driver provides the interface between the microprocessor and the safety relay to turn safety relay connectors on or off depending on the command from the microprocessor. In at least one embodiment has its own ground fault current interruption (GFCI) circuit to prevent any hazardous shocks. For example, in one prototype the GFCI circuit from the connection with the regular charging station was utilized. A manual switch is preferably accessible from the exterior of the control unit, such as on its cover.

It is important to understand the role of the EV emulator in this embodiment of the invention which uses a select middleman approach to retrofit existing charge stations to provide multiple EV charging according to the present invention. An existing charge station is configured for charging a single EV according to the J1772 specification, wherein it performs communications with the EV, and decides when to turn power on and off for charging that EV. Rather than re-engineering the entire single EV charger, a single box middle-man solution is coupled to the existing charger. The AC outputs from the single charger are then shared across multiple EV connection cords. Thus, the original EV charger is really supplying charge for multiple EVs, such as four as given in the examples. Yet the original charger can only operate according to its original single EV functionality in response to pilot signal communication from a single EV and of course cannot charge multiple EVs, regulating charge individually to each one in response to user preferences, available power, and the state of the power grid. An EV emulator is thus provided which fools the original charger into thinking it is charging a single EV. This is performed by the EV emulator, which controls the pilot signal from the original charger in a way that it acts like an EV being charged. The pilot signal generator of the present invention generates multiple pilot signals which are routed through the actual connections to the multiple EVs which share the single set of power connections from the original single EV charger. Based on what is happening with the actual charging of the multiple EVs, the EV emulator modulates the pilot signal to the original charger to keep it sourcing power which is shared according to the invention across the multiple EVs under charge.

The pilot signal generator and ZigBee module are connected in order to provide information to a ZigBee coordinator, which relays the information to the gateway, which is in turn gathered by the server. The station controller and data collector receive this information, evaluate it, and then provide commands back through the gateway, to the ZigBee coordinator, which sends the commands back to the control unit to carry out instructions accordingly.

5.5. Real-Time Equal Level 2 Charging.

Figure 20A:
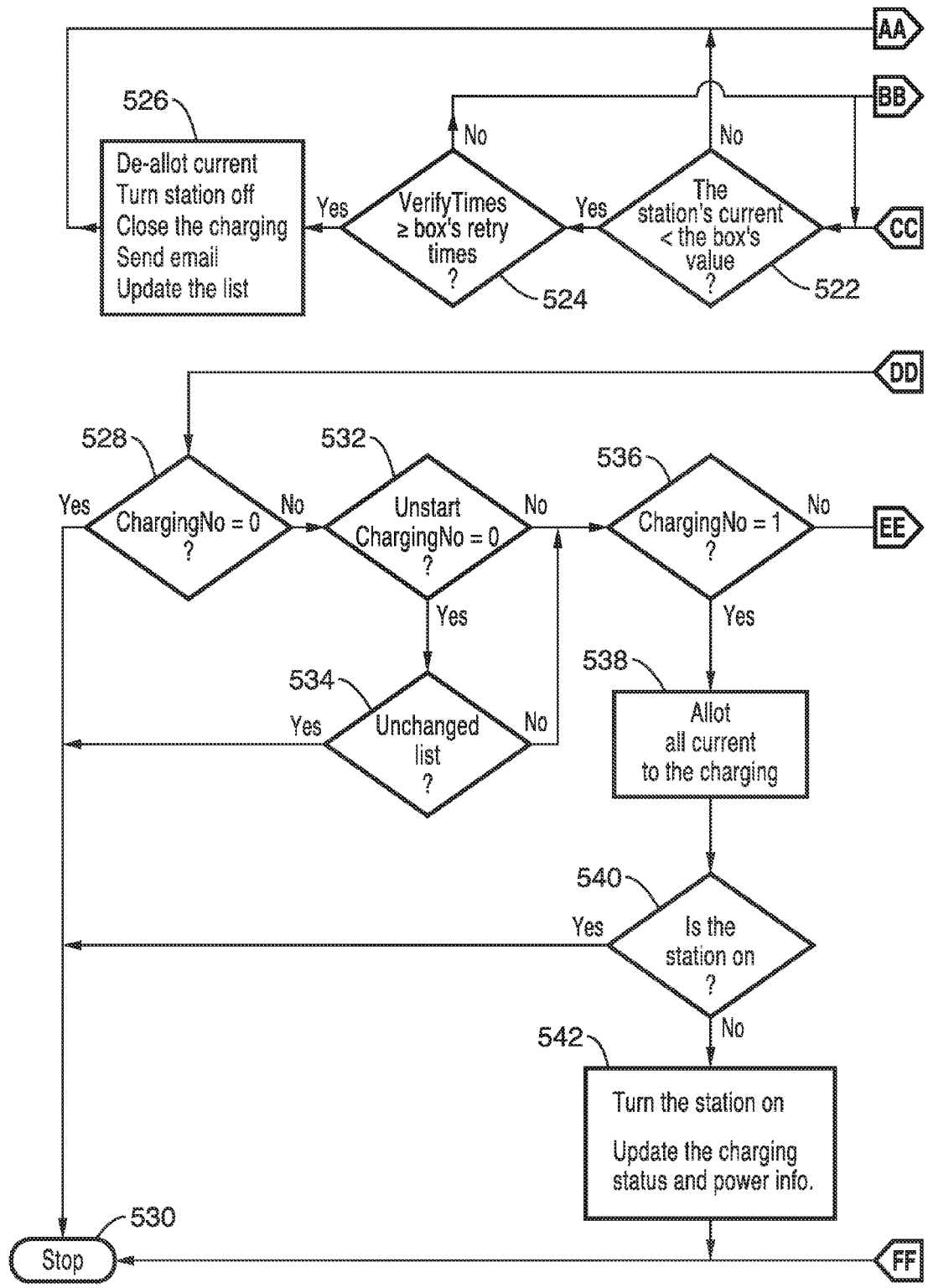
FIG. 20A and FIG. 20B is a flow diagram of real-time equal level 2 charging according to an embodiment of the present invention.
Figure 20B:
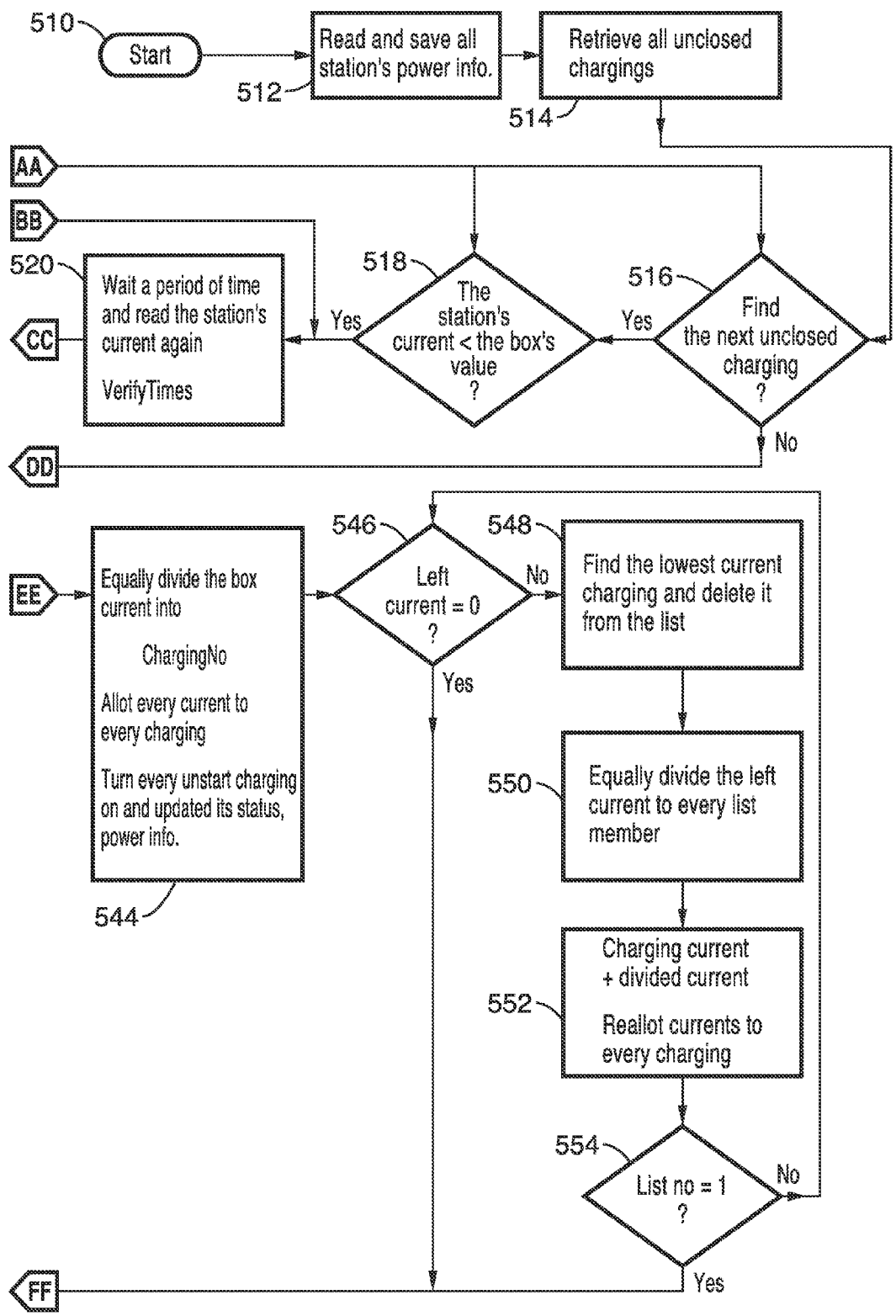

FIG. 20A and FIG. 20B illustrate an example embodiment of real-time equal level 2 charging, using the charging box described in a previous section. Programming executing this flowchart provides for charging multiple vehicles collectively at the same current, with the ability to separately change charging levels if necessary to optimize charging based on available charge power, user preferences, EV charge state, and the state of the power grid.

It should be appreciated that a charging box according to this embodiment has its own retrieval loop (e.g. 60 seconds, 90 seconds, etc.) and each charging box is capable of having different timed retrieval intervals. Also, in a preferred embodiment, all information generated through execution according to the flowchart is checked by the system at these retrieval intervals. Various loops are shown in the flowchart which process and return to a previous step as necessary.

Referring to FIG. 20B, the process begins 510 and the system reads and saves 512 all the charging stations power information. The station controller and data collector will then retrieve all the unclosed chargings 514, that is to say charging sessions which should be closed but are still active. In the case of unclosed charging, a check is made 518 if the stations current capacity is less than the current value for the charging box. If not, then a return is made to find 516 the next unclosed charging session. If available station current is less than available charging box current, then a delay and verification step 520 is performed. Another check is made 522 if station current is less than charging box current, with a return to step 516 if it is not. Otherwise, a check is made 524 to verify times if it is greater than or equal to charging box retry times. If not then execution returns to block 520 in a waiting period. Otherwise, processing is performed 526 including cancelling the current allotment, turning the station off, closing the charging, sending an email and updating the list.

If no unclosed charging sessions then a check is made 528 if there are no EVs being charged, whereupon the charging routine terminates 530. With at least one EV to be charged a decision is made 532 if there is an EV leaving the station, if so then the list is checked 534 to determine if it is unchanged. If the list of EVs charging is unchanged, then routine terminates 530. Otherwise, a check is made 536 if a single EV is being charged, if so then all current (e.g. this charging box embodiment configured to provide 30 Amps total) is allotted 538 for that single charging, and if the station is not already activated 540, then it is turned on 542, and the routine terminates 530. In the case where multiple EVs are charging, as detected at block 536, then block 544 is executed in which charging current is equally divided, such as by equally dividing the available charging box current by the number of EVs being charged, turning unstart charging on and updating status and power information.

It will be noted that despite the amount of current allocated, each EV will only charge at the rate determined by the EV, depending for example on the EV and the state of charge of its battery. If the EV charge capacity is less than the current allocated to the EV, then there will be current "left over," as detected in block 546. In response to this left over current, the this EV having reduced current charging is deleted from the EV list 548 (in preparation for reallocation) and the left over current is equally divided to the other charging list members 550 and charging current redetermined and allocated 552. If the check for left over current has not proceeded through all the list members as determined at block 554, then a return made to block 546 checking for other left over current, otherwise the process terminates 530. Thus, it is seen that if the EV charge capacity is below the amps capable of being distributed by the charging box, then excess power is not wasted but used to increase the rate of charge for EVs seeking a higher charge rate. By way of example, consider a charging station with 3 vehicles, and one EV can currently take 6 Amps, but the charging station can allot that vehicle 10 Amps. The charging station will use the excess 4 Amps from this EV and, if it can be used by other EVs, then the excess 4 Amps is distributed to the other two vehicles evenly. Therefore, the other two EVs being charged at the charging station can receive a total of 12 Amps each. This process can again be repeated among all the vehicles at the charging station. This means that at a station consisting of 4 charging EVs the Amps being accepted by each vehicle may for instance be 0 Amps, 6 Amps, 10 Amps, 14 Amps. After charging is completed for one or more EVs, the current allocated to charge that EV is reallocated again to the other EVs until charging for those EVs is finished. This distribution of controllable, yet different level current is possible with the use of current control.

5.6. Advantages of Real-Time Equal Level 2 Charging.

As described above, the present invention provides a number of benefits for smart charging of electric vehicles (EVs), and in particular charging in a grid-friendly manner. The following is a list highlighting benefits of the invention.

Using an RFID badge to facilitate charging with the present invention provides a faster, more secure way to identify an EV and EV user, and can eliminate the need for an online login.

The use of barcode reading (e.g., 1D, 2D, or QR codes) provides the EV user a faster and more convenient way for station recognition, as the user does not have to provide charging station information before beginning to charge the EV. Users do not need to select city/organization, parking lot, charging box and station, as they just scan the station's 1D or 2D barcode with their mobile phone, or other portable device, to register the station ID.

The system provides the ability to satisfy local grid or building power availability as necessary by lowering EV charging currents. It should be appreciated that a parking lot is generally associated with a given building from which it draws power. This building, at times, needs to consume large amounts of energy (e.g., running air conditioning systems in the heat of the day). This consumption is closely monitored by the system and when it gets close to a point where there is danger of the demand exceeding supply or leading to increases in demand charges, the system can begin to lower the energy consumption by changing the charge rates of the EVs. This process aids in preventing overloading the grid and can help building operators to avoid extra charges or shortages.

The system can determine the state of the power grid, or local grid, such as in a building in response to a number of different determinations or predictions. For example grid utilization information can be obtained from the utility by both advanced information provided to the control center by the utility, and by way of real-time data streamed through the internet to the control center. Similarly, in a given building associated with a parking structure, information can be obtained on the relative utilization of the grid, from which decisions on changing charge currents can be made by the system in response to preferences established for the system by the building operator. In addition, the system can predict when energy peaks are coming due to use of demand cycles.

The system provides optimization of charging capability based on multiple parameters. An additional way in which charging is optimized is by preferably changing charge current levels in a smooth fall/rise which maximizes charging of the EV battery and minimizes cost. The process of turning charging on and off is less efficient.

Figure 21A:
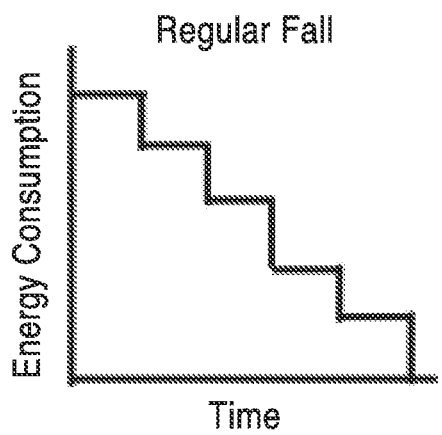
FIG. 21A through FIG. 21D are graphs of energy consumption for EV's attempting to satisfy local grid needs according to an embodiment of the present invention.
Figure 21B:
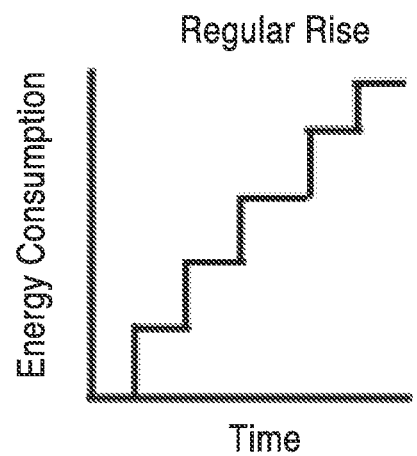
Figure 21C:
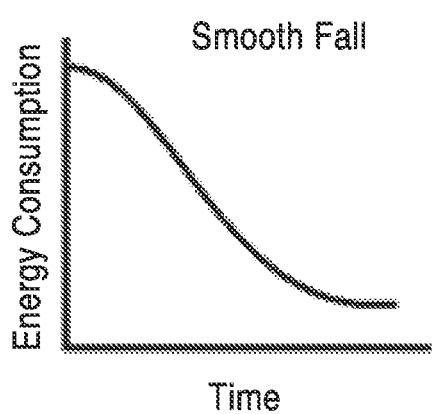
Figure 21D:
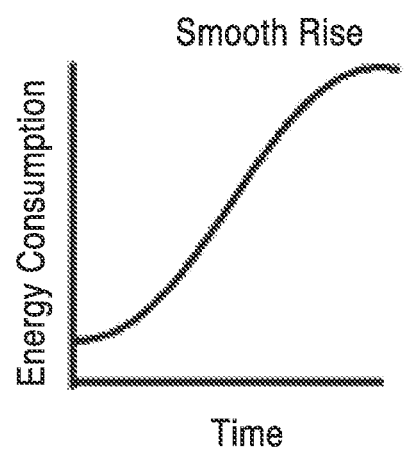

FIG. 21A through FIG. 21D depict energy consumption curves for EVs attempting to satisfy local grid constraints by lowering energy use, and then restoring charge current levels when grid power constraints are eased. In FIGS. 21A and 21B, examples are seen for stepping energy consumption down and up again, respectively in a step wise manner. A preferred current control by the invention is shown in FIGS. 21C and 21D of smoothly shifting energy consumption down and up again, respectively in a more efficient manner. These smooth transitions of current output can be performed for example by smoothly changing the PWM of the associated pilot signals between two maximum allowable current levels, whereby as the EV responds by changing current levels it is doing so slowly and incrementally.

The inventive charging system also has the flexibility to satisfy each EV user's preference (e.g., charge only when market price is low, charge at maximum rate until fully charged, charge over a span of eight hours to reach maximum charge, only charge EV battery half way, and so forth). With several EVs plugged in at once, the achievement of these preferences can be optimized, because each EV can charge at different currents.

The inventive charging system provides the EV user with more options for parking, and reducing or possibly even eliminating the need for designated parking spots for EVs. This ability can thus also eliminate the need for limited time parking spots. These limited time parking spots can require an EV user to repark after the time is elapsed. For example, in Los Angeles, it is typical for an EV charging station to provide three or four hour parking spots for EVs with an $80 fine if the vehicle is parked longer than the limit. The need to move a vehicle during work hours is unproductive and provides an EV user with an unnecessary task. The benefit is readily seen for being able to park an EV in a single spot for a larger amount of time. The charging system of the invention can provide several EVs in a parking structure with access to charging cables regardless of their parking spot.

The use of current control in the inventive charging system gives the system flexibility to make judgments based on statistics and decide what is most economic and cost efficient for the EV user. By way of example, consider several EVs parked and connected to one charging box. The system reads that one EV needs 1 Kilowatt per hour over the next 5 hours and another EV needs 1.2 Kilowatts over the next 4 hours. The system has the capability to satisfy these needs to the best of its ability depending on availability and user preference.

The present invention can lower infrastructure costs in relation to a one-to-one charging station to EV scenario. Currently most EVs charge at a single charging station (EVSE) with a single connector. This is a very expensive installation, with a single station and connector costing upwards of $15,000 to $20,000, and does not include the costs associated with use of designated parking spaces and the overhead and equipment for managing that process.

5.7. Unique Features in Feature Descriptions.

The following are miscellaneous identification and description of certain elements exemplified in FIG. 17, or described in the text, of unique features in this present invention.

RFID badge 430 holds EV and EV user information. RFID reader 428 reads the RFID badge and sends information to the microprocessor of the gateway. ZigBee gateway 426 gathers and communicates information to the server. There is an interface that connects ZigBee to the RS-232 port. ZigBee is used to receive and sends information to the control units. EV emulator 446a, 446b imitates an EV, making the regular charging station believe an EV is present, so that power is provided to the entire system. A computer processor (e.g., microprocessor) with pilot signal circuit generates the pilot signals for all EVs in the charging box and communicates with the ZigBee coordinator. There is a plug for the safety relay that will shut off the cable if the EV is not plugged in.

An auto reset mechanism is provided as a switch that can be controlled by the system operator that will turn off the EV emulator, thus turning off the regular charging station, then turning the EV emulator back on to reset the entire system. In one embodiment, this comprises the control unit manual switch accessible on the exterior of the control unit housing.

There is a relay driver operating as an interface between the microprocessor and the safety relay. It turns the relay on or off when the microprocessor sends a signal to it.

5.8. Unique Features in System Design and Architecture.

Charge current control according to the invention optimizes: (a) utilization of circuit capacity at the individual circuit level, (b) current through an EV based on end-date-and-time schedule of EV owner. Current control is modulated based on available power, user preferences, EV charge status and grid status. Grid status, it will be appreciated, can be determined as provided by the power utility at any given point in time, such as by advanced information, or real-time data streamed through the internet to the control center. In addition, EV charge current levels can be based on any combination of input from grid operator, such as demand response input, garage operator (such as maximum current constraint), user (such as preferences for end-date-and-time charge levels desired) and from the EV itself (such as desired current draw). Current control decisions can be made in either a central control center or in the edge embedded devices, controlling localized charging stations.

In at least one embodiment of the invention, the control center utilizes the cloud model of computing, instead of one or more discrete localized servers, for achieving rapid speed of response times at diverse geographic locations.

Smart charging is performed in at least one embodiment based on price-based charging, whereby user preferences on price thresholding are gathered, and the charging rate is partially determined in response to the comparison between one or more user price thresholds and the actual energy price rate.

Local redistribution of power is performed by the inventive charge system based on constraints of the EVs or the grid. For example, if a given EV is unable or unwilling to take a certain amount of power that is designated by the charge controller, then based on measurement of the power consumption and in combination with other inputs about the other EVs the controller redistributes power levels to other EVs to maximize capacity utilization.

User preferences in at least one embodiment include information about the time available for charging the vehicle, such as given as a charging parameter by the user. In this embodiment, a premium may be charged for charging the vehicle in a reduced timeframe. For example, a commuter may arrive at the charging station in the morning and desire receiving a full charge before heading on a trip at 11 AM. However, if numerous EVs are set for charging in a round robin manner based on available power, each vehicle may not obtain a full charge in just two to three hours. In this aspect, vehicles in need of short turn-around charging are able to obtain a somewhat increased charge current at a higher cost.

The controller device is embodied within a separate electronic box that is separated from the electrical components of the charging station, thus facilitating retrofitting existing charging stations according to the present invention. This middle-man approach is particularly useful in view of incorporating an EV emulator, which communicates on the pilot signal of the original single EV charger so that it properly outputs current which is shared by the multiple EVs which are each sent a separate pilot signal by the present invention.

The inventive charging system also enables grid friendly charging when the charging station is part of a building, whereby the charging system controls individual charge rates in a smart fashion to minimize power demand charges for the building itself.

The inventive charging system is designed for smooth current control, with a special case of current control being a multiplexing approach in which charge current is at EV demand or zero.

The inventive charge system can provide equal opportunity charging (EOC) wherein the available charging current is equitably distributed, and any left over current redistributed to optimize charging.

The inventive charge system can even be utilized in select configurations to enable electricity to flow back to the grid. This is an element that could be utilized in select circumstances, in a select way, over a short interval (e.g., less than an hour) to have minimal impact on the vehicles being charged. For example, current would first be drawn from vehicles having the highest level of charge, preventing leaving any EV with a flat battery. This ability provides additional assurance to a building operator that the operation of critical systems could be sustained even if the grid conditions were uncertain.

The charge system invention provides an equal charging method for level 2 charging that can be used for a single power source or multiple power sources. When a charge box has only one vehicle charging, all current can be provided to that vehicle. For each new vehicle introduced on the unit, the current is divided equally among all the vehicles on the unit. Additionally, if the power source has 60 amps and only 1 vehicle charging, all 60 amps can be allotted to that vehicle (though not necessary used), and when 2 vehicles are charging, the default is to divide the current evenly and each vehicle would be allocated maximum of 30 amps. Yet, if the first vehicle only consumes 20 amps, the remaining 10 amps are provided as needed to the second vehicle thus allocating it with a total of 40 amps. If one vehicle reaches full charge or leaves the charger, the method then re-assigns its charge current to the remaining vehicles receiving current from that charge station.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

From the discussion above it will be appreciated that the invention can be embodied in various ways, including the following:

1. An apparatus for charging electric vehicles, comprising: a charging station configured for connecting multiple electric vehicles (EVs) to a single charging station for receiving and sharing current from a power grid; a coordinator system coupled to each said charging station for generating multiple pilot control signals, one for each EV being charged, for communicating information with each of said multiple EVs and specifying maximum charge current available to each of said multiple EVs; a gateway device configured for communicating with and controlling said coordinator system; said gateway device sends commands to said coordinator system to set said maximum charge current for each EV in response to distributing an amount of charge current available at the charging station toward dividing it up across the number of EVs coupled to the charging station.

2. The apparatus of any of the previous embodiments, wherein said charge current available is divided up equally to each charging EV, and upon determining that a given EV is using less than its maximum charge current specified by the pilot signal, then the current allotment to this vehicle is reduced by lowering maximum charge current level signaled in said pilot signal by the coordinator, and this additional current is made available to the other EVs charging from the charge station by increasing their allotment as signaled to the EV by raising its maximum charge current level signaled in said pilot signal by the coordinator.

3. The apparatus of any of the previous embodiments, further comprising said gateway device determining a change in amount of charge current available at the charging station, and redetermining maximum charge current levels for each EV.

4. The apparatus of any of the previous embodiments, wherein said change in the amount of charge current available is determined in response to determining present or predicted state of the power grid, or of allocations of current from that power grid.

5. The apparatus of any of the previous embodiments, wherein said gateway device is configured with multiple communications channels, comprising at least a first communication channel for connection to a server over a communications network, and at least a second communications channel for connection to said coordinator system.

6. The apparatus of any of the previous embodiments, wherein said first communication channel comprises a wireless mobile communications connection.

7. The apparatus of any of the previous embodiments, wherein said second communication channel comprises a wireless short range communications connection.

8. The apparatus of any of the previous embodiments, wherein said wireless short range communications connection comprises a ZigBee protocol.

9. The apparatus of any of the previous embodiments, wherein each said coordinator system comprises a control unit having a computer processor, pilot signal generator and pilot signal monitor.

10. The apparatus of any of the previous embodiments, wherein said pilot signals are generated according to SAE J1772 specification.

11. The apparatus of any of the previous embodiments, wherein prior to starting to charge an EV of the EV user, the server obtains a user EV identification and charging station identification.

12. The apparatus of any of the previous embodiments, wherein said user EV user identification is obtained in response to a user logging on to the server.

13. The apparatus of any of the previous embodiments, wherein said charging station identification is obtained in response to the user scanning of a 1D or 2D barcode of said charging station on a mobile device of the user, which communicates both charging station identification and user information to the server.

14. The apparatus of any of the previous embodiments, wherein user EV identification is obtained in response to retrieval of a user EV identification by a reader device at the charge station, after which the user EV identification along with associated charge station identification at which the card was read, are communicated to the server.

15. The apparatus of any of the previous embodiments, wherein said reader device comprises a radio frequency identification (RFID) system reading an RFID tag or badge of the user or associated EV at the charge station.

16. The apparatus of any of the previous embodiments, wherein said communication network connected to said server comprises an internet.

17. The apparatus of any of the previous embodiments, further comprising meters coupled to said gateway for measuring voltage and current supplied to each of said multiple EVs being charged at the charging station.

18. The apparatus of any of the previous embodiments, further comprising an EV emulator which controls operation of the single charging station by imitating an EV, making the single charging station believe an EV is present, while the coordinator is actually setting current flows to multiple EVs by communicating pilot signals these multiple EVs.

19. The apparatus of any of the previous embodiments, wherein turning off said EV emulator causes the single charging station to turn off.

20. An apparatus for controlling charging of electric vehicles at a charging station, comprising: a coordinator system configured for integration onto a single charging station that is configured for connecting multiple electric vehicles (EVs) to share current from the power grid connection of the single charging station; said coordinator system is configured for generating multiple pilot control signals, one to each EV being charged, for communicating information with each of said multiple EVs and specifying maximum charge current available to each of said multiple EVs; said coordinator system is also configured with an EV emulator which controls operation of the single charging station by imitating an EV, making the single charging station believe an EV is present so that it still generates EV charging power which now is being split between the multiple EVs; a gateway device configured for communicating with and controlling said coordinator system; said gateway device sends commands to said coordinator system to set said maximum charge current for each EV in response to distributing an amount charge current available from the single charging station toward dividing it up across the number of EVs coupled to the charging station.

21. A method of charging electric vehicles (EVs), comprising: (a) inserting a middle-man layer between an internet and a single EV charging station connected to a power grid having a given state in relation to present power availability; (b) communicating EV charging commands from a server to a gateway device in the middle-man layer; and (c) communicating charging commands from the gateway device to a power coordinator in the middle-man layer, said power coordinator generating multiple pilot signals to multiple EVs coupled to the middle-man layer which shares the charging current available from the single EV charging station; (d) modulating pulse widths in each of the multiple pilot signal configured for connection to multiple EVs for specifying maximum charge current available to each of these multiple EVs which are sharing charge current from said single EV charging station; (e) emulating a single EV to the single EV charging station so that its control circuits still generate EV charging power which is now being split between the multiple EVs by the middle-man layer; and (f) distributing an amount of charge current available at the charging station by dividing it up across the number of EVs coupled to the given charging station, and varying the current allocations to each EV based on user specified charge parameters, EV current use, as well as the state of the power grid or power allocations.

22. An electric vehicle charging apparatus, comprising: a power input; a plurality of power outputs; a programmable processor; and programming executable on the processor for multiplexing delivery of charging current from said power input to each said power output.

23. The apparatus of any of the previous embodiments, wherein said programming multiplexes delivery of charging current from said power input to said power outputs to allow source capacity at said power input to be less than aggregate load connected to said power outputs.

24. The apparatus of any of the previous embodiments, wherein said programming independently controls duty cycle and power level at each said power output.

25. The apparatus of any of the previous embodiments, wherein said programming performs steps comprising: (a) if a single load requires charging current, providing charging current to said single load; (b) if a plurality of loads require charging current, dividing available charging current among said loads evenly; and (c) if a load requires less charging current than is available to said load in step (b), reallocating excess charging current evenly among the remaining loads.

26. The apparatus of any of the previous embodiments, wherein said programming performs steps comprising: (a) retrieving and storing power capacity information from a charging station to which said power input is connected; (b) monitoring charging current delivery to each said power output; (c) determining if a new load connects to a power output; (d) determining if a load connected to a power output requires charging current; (e) determining if a load disconnects from a power output; (f) if no load is connected to a power output requires charging current, waiting for a load to require charging current; (g) if a single load requires charging current, providing charging current to said single load; (h) if a plurality of loads require charging current, dividing available charging current among said loads evenly; and (i) if a load requires less charging current than is available to said load in step (h), reallocating excess charging current evenly among the remaining loads.

27. The apparatus of any of the previous embodiments, further comprising: a communications interface connected to said processor; wherein said processor is configured communicate with a server over said communications interface;

wherein said server provides instructions to said processor for providing charging current to a power output based on one or more charging parameters.

28. The apparatus of any of the previous embodiments, wherein said charging parameters are selected from a group of parameters consisting of local grid power need, local grid power availability, local grid peak energy status, predicted peak energy periods, location of a charging station connected to said power input, and power availability to a charging station connected to said power input.

29. The apparatus of any of the previous embodiments, further comprising: a second communications interface connected to said processor; wherein said second communications interface is configured for receiving a signal associated with a specific user's load connected to a power output; and wherein said charging parameters comprise user preferences selected from the group consisting of location where charging is permitted, time during which charging is permitted, cost of power for charging, and charge level at which a charge cycle is terminated.

30. A method for charging electric vehicles, comprising multiplexing delivery of charging current from a power input to a plurality of power outputs.

31. The method of any of the previous embodiments, further comprising multiplexing delivery of charging current from said power input to said power outputs to allow source capacity at said power input to be less than aggregate load connected to said power outputs.

32. The method of any of the previous embodiments, further comprising independently controlling duty cycle and power level at each said power output.

33. The method of any of the previous embodiments, further comprising: (a) if a single load requires charging current, providing charging current to said single load; (b) if a plurality of loads require charging current, dividing available charging current among said loads evenly; and (c) if a load requires less charging current than is available to said load in step (b), reallocating excess charging current evenly among the remaining loads.

34. The method of any of the previous embodiments, further comprising: (a) retrieving and storing power capacity information from a charging station to which said power input is connected; (b) monitoring charging current delivery to each said power output; (c) determining if a new load connects to a power output; (d) determining if a load connected to a power output requires charging current; (e) determining if a load disconnects from a power output; (f) if no load is connected to a power output requires charging current, waiting for a load to require charging current; (g) if a single load requires charging current, providing charging current to said single load; (h) if a plurality of loads require charging current, dividing available charging current among said loads evenly; and (i) if a load requires less charging current than is available to said load in step (h), reallocating excess charging current evenly among the remaining loads.

35. The method of any of the previous embodiments, further comprising providing charging current to a power output based on one or more charging parameters selected from a group of parameters consisting of local grid power need, local grid power availability, local grid peak energy status, predicted peak energy periods, location of a charging station connected to said power input, and power availability to a charging station connected to said power input.

36. The method of any of the previous embodiments, further comprising providing charging current to a power output based on one or more preferences of a user whose electric vehicle is connected to a power output, said preferences selected from the group consisting of location of the electric vehicle, time during which a user permits charging, cost of power for required for charging, and charge level at which a charge cycle is terminated.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

States for SAE J1772 Pilot

| State | Pilot High | Pilot Low | Freq. | EV Res. Ω | Description |
|---|---|---|---|---|---|
| A | +12 V | N/A | DC | N/A | Not Connected |
| B | +9 V | −12 V | 1 kHz | 2.74k | Connected & Not Ready |
| C | +6 V | −12 V | 1 kHz | 882 | EV Charge |
| D | +3 V | −12 V | 1 kHz | 246 | EV Charge, Vent required |
| E | 0 V | 0 V | N/A | — | Error |
| F | N/A | −12 V | Not DC or 1 kHz | — | Unknown/Error |

TABLE 2

Commands and Return Values for Charging Station

| Command | Description and Example |
|---|---|
| atrs | Auto-reset the whole system, including gateway, meters, relays, and control unit<br>comdatrs0000<br>[return]: N/A |

TABLE 2-continued

Commands and Return Values for Charging Station

| Command | Description and Example |
|---|---|
| duty | Change the duty cycle<br>comdduty0150<br>[describe]: change channel 1 duty cycle to 50%; *duty cycle: 10-85 (6 A~51 A)<br>[current = duty cycle * 0.6] 86~96 (55 A~80 A), [current = (duty cycle-64) * 2.5] [return]:<br>duty0150rely0100plug0101stat0100 |
| enab | Enable EV charging<br>comdenab0100<br>[describe]: enable channel 1; [return]: duty0125rely0100plug0101stat0100 |
| rely | Turn on/off the relay manually<br>Ex1: comdrely0101 [describe]: turn on relay at channel 1; [return]:<br>duty0150rely0101plug0101stat0100<br>Ex2: comdrely0100 [describe]: turn off relay at channel 1; [return]:<br>duty0150rely0100plug0101stat0100 |
| rest | Disable EV charging<br>comdrest0100 [describe]: disable channel 1; [return]: duty0100rely0100plug0101stat0100 |
| stat | System status request<br>Ex1: comdstat0100 [describe]: request channel 1 status; [return]:<br>duty0150rely0101plug0101stat0100<br>Ex2: comdstat9900 [describe]: request all channels status |

TABLE 3

Example EV Response Times with Nissan Leaf

| | $I_{init}$ | $I_{final(A)}$ | | |
|---|---|---|---|---|
| | (A) | 0 | 8 | 12 |
| $T_{EvExe}$ (ms) | 0 | | 1000 | 1000 |
| | 8 | 100 | | 250 |
| | 12 | 100 | 5000 | |
| $T_{EvResp}$ (ms) | 0 | | 3000 | 5000 |
| | 8 | 10 | | 60 |
| | 12 | 10 | 60 | |
| $T_{Ev}$ (ms) = | 0 | | 4000 | 6000 |
| $T_{EvExe} + T_{EvResp}$ | 8 | 110 | | 310 |
| | 12 | 110 | 5060 | |

What is claimed is:

1. An electric vehicle charging apparatus for charging electric vehicles, comprising:
   (a) an electric vehicle (EV) charge management system having a power input, and a plurality of power outputs;
   (b) at least one programmable processor in said EV charge management system with programming executable on the at least one processor for multiplexing delivery of charging current from said power input of said EV charge management system to each said power output thereof, performing the steps:
      (i) controlling the charging of electric vehicles within said EV charge management system;
      (ii) retrieving and storing power capacity information from a charging station to which said power input is connected;
      (iii) monitoring charging current delivery to each said power output;
      (iv) determining if a new load connects to a power output;
      (v) determining if a load connected to a power output requires charging current;
      (vi) determining if a load disconnects from a power output;
      (vii) if no load is connected to a power output requires charging current, waiting for a load to require charging current;
      (viii) if a single load requires charging current, providing charging current to said single load;
      (ix) if a plurality of loads require charging current, dividing available charging current among said loads evenly; and
      (x) if a load requires less charging current than is available to said load in step (ix), reallocating excess charging current evenly among the remaining loads.

2. The apparatus of claim 1, wherein said programming multiplexes delivery of charging current from said power input to said power outputs to allow source capacity at said power input to be less than aggregate load connected to said power outputs.

3. The apparatus of claim 1, wherein said programming independently controls duty cycle and power level at each said power output.

4. The apparatus of claim 1, wherein said programming performs steps comprising:
   (a) if a single load requires charging current, providing charging current to said single load;
   (b) if a plurality of loads require charging current, dividing available charging current among said loads evenly; and
   (c) if a load requires less charging current than is available to said load in step (b), reallocating excess charging current evenly among the remaining loads.

5. The apparatus of claim 1, further comprising:
   a communications interface connected to said processor;
   wherein said processor is configured communicate with a server over said communications interface;
   wherein said server provides instructions to said processor for providing charging current to a power output based on one or more charging parameters.

6. The apparatus of claim 5, wherein said charging parameters are selected from a group of parameters consisting of local grid power need, local grid power availability, local grid peak energy status, predicted peak energy periods, location of a charging station connected to said power input, and power availability to a charging station connected to said power input.

7. The apparatus of claim 5, further comprising:
   a second communications interface connected to said processor;
   wherein said second communications interface is configured for receiving a signal associated with a specific user's load connected to a power output; and wherein said charging parameters comprise user preferences selected from the group consisting of location where charging is permitted, time during which charging is permitted, cost of power for charging, and charge level at which a charge cycle is terminated.

8. A method for charging electric vehicles, comprising multiplexing delivery of charging current from a power input to a plurality of power outputs, comprising the steps:
  (a) controlling the charging of electric vehicles on at least one processor and memory storing instructions within an electric vehicle (EV) charge management system;
  (b) retrieving and storing power capacity information in said EV charge management system from a charging station to which said power input is connected;
a which when executed by the processor perform steps comprising
  (c) monitoring charging current delivery from said EV charge management system to each said power output;
  (d) determining if a new load connects to a power output;
  (e) determining if a load connected to a power output requires charging current;
  (f) determining if a load disconnects from a power output;
  (g) if no load is connected to a power output requires charging current, waiting for a load to require charging current;
  (h) if a single load requires charging current, providing charging current to said single load;
  (i) if a plurality of loads require charging current, dividing available charging current among said loads evenly; and
  (j) if a load requires less charging current than is available to said load in step (i), reallocating excess charging current evenly among the remaining loads.

9. The method of claim 8, further comprising multiplexing delivery of charging current from said power input to said power outputs to allow source capacity at said power input to be less than aggregate load connected to said power outputs.

10. The method of claim 8, further comprising independently controlling duty cycle and power level at each said power output.

11. The method of claim 8, further comprising:
  (a) if a single load requires charging current, providing charging current to said single load;
  (b) if a plurality of loads require charging current, dividing available charging current among said loads evenly; and
  (c) if a load requires less charging current than is available to said load in step (b), reallocating excess charging current evenly among the remaining loads.

12. The method of claim 8, further comprising providing charging current to a power output based on one or more charging parameters selected from a group of parameters consisting of local grid power need, local grid power availability, local grid peak energy status, predicted peak energy periods, location of a charging station connected to said power input, and power availability to a charging station connected to said power input.

13. The method of claim 8, further comprising providing charging current to a power output based on one or more preferences of a user whose electric vehicle is connected to a power output, said preferences selected from the group consisting of location of the electric vehicle, time during which a user permits charging, cost of power for required for charging, and charge level at which a charge cycle is terminated.

* * * * *